United States Patent [19]

Miura et al.

[11] Patent Number: 4,866,593
[45] Date of Patent: * Sep. 12, 1989

[54] PHOTOSENSITIVE PRINTING APPARATUS

[75] Inventors: Teiji Miura; Toshihide Okamura; Nobumasa Abe; Masatoshi Yonekubo; Hidetoshi Yoshitaki; Hideo Yamazaki, all of Nagano, Japan

[73] Assignee: Seiko Epson Corporation, Tokyo, Japan

[*] Notice: The portion of the term of this patent subsequent to Feb. 23, 2005 has been disclaimed.

[21] Appl. No.: 98,591

[22] Filed: Sep. 18, 1987

Related U.S. Application Data

[63] Continuation of Ser. No. 740,120, May 31, 1985, Pat. No. 4,727,380.

[30] Foreign Application Priority Data

| May 31, 1984 [JP] | Japan | 59-111489 |
| May 31, 1984 [JP] | Japan | 59-111490 |
| May 31, 1984 [JP] | Japan | 59-111491 |

[51] Int. Cl.$^4$ .................................. A01D 9/42
[52] U.S. Cl. .................... 346/107 R; 354/4; 355/1
[58] Field of Search ............ 346/107 R, 108, 160; 354/4; 355/1; 350/96.1, 96.24

[56] References Cited

U.S. PATENT DOCUMENTS

| 3,944,362 | 3/1976 | Dailey | 355/1 |
| 4,427,283 | 1/1986 | Gasper | 355/1 |
| 4,427,831 | 1/1986 | Gasper | 355/1 |
| 4,482,214 | 11/1984 | Hill | 350/96.1 |
| 4,532,526 | 7/1985 | Behrens | 346/107 R |
| 4,564,853 | 1/1986 | Egan | 346/108 |
| 4,576,435 | 3/1986 | Nishioka | 350/962.4 |
| 4,727,380 | 2/1988 | Miura | 346/108 |

Primary Examiner—E. A. Goldberg
Assistant Examiner—Mark Reinhart
Attorney, Agent, or Firm—Blum Kaplan

[57] ABSTRACT

A printing apparatus for use in a printer with a photosensitive drum. The printing apparatus includes a spotlight source for generating a light provides essentially a point source. A photo-optical converter which is optically coupled to the spotlight source converts the light from the spotlight source to linear rays of light. A plurality of microshutters optically coupled to the photo-optical converter selectively transmits the light at selected portions of the array to the photo-sensitive drum. As a result, a light path is defined from the spot-light source through the photo-optical converter and the microshutters to the photo-sensitive drum.

3 Claims, 28 Drawing Sheets

FIG.14
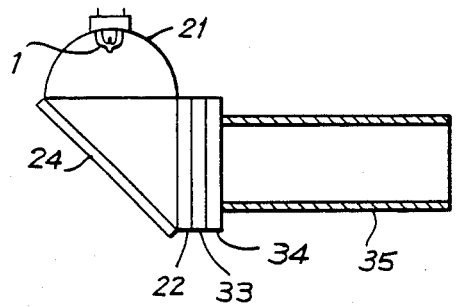
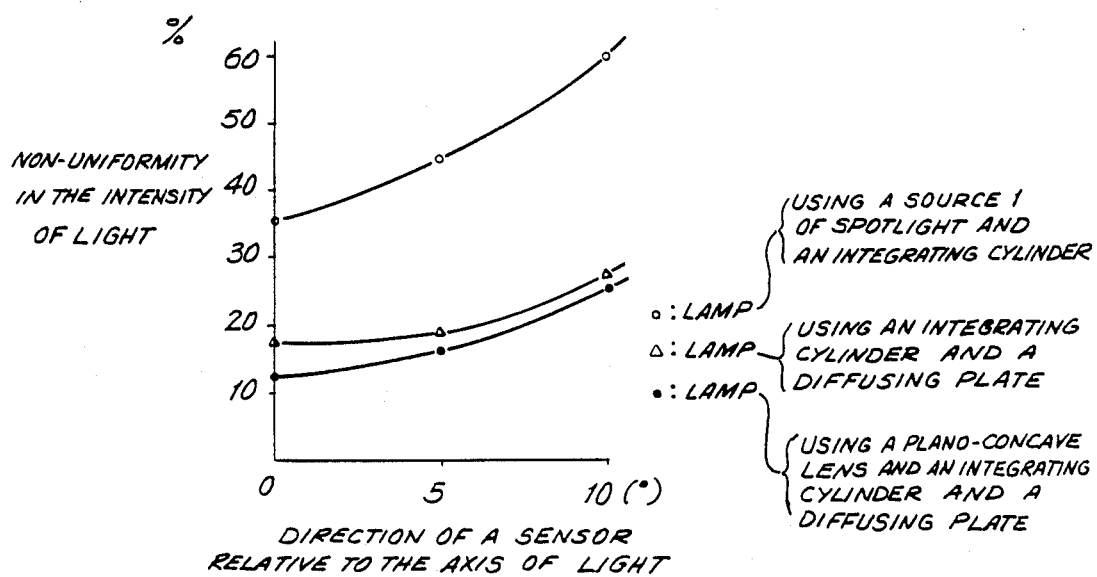
FIG.15

FIG. 16
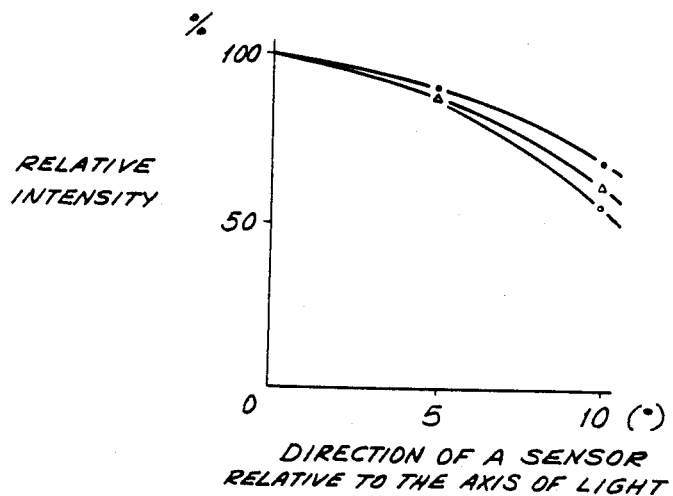
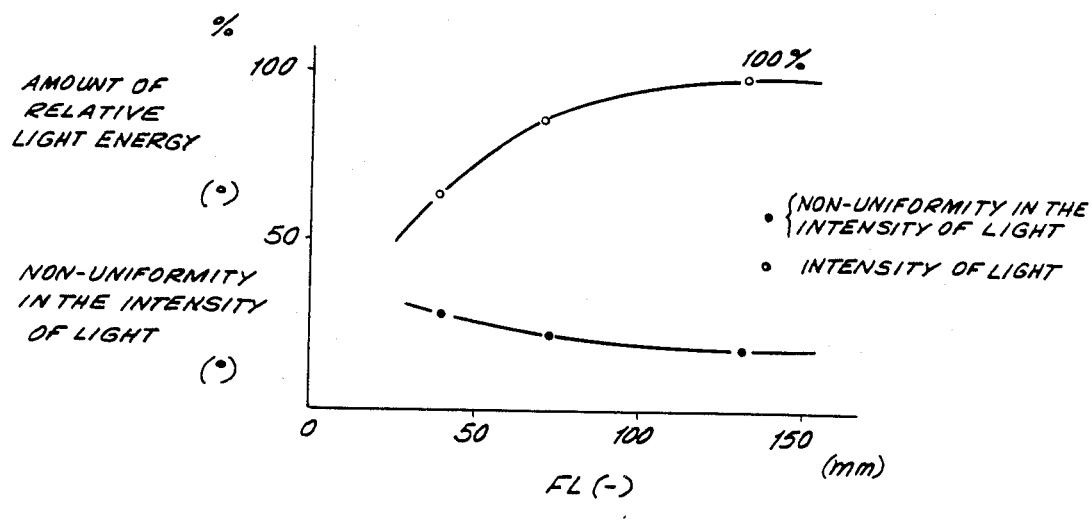
FIG. 17

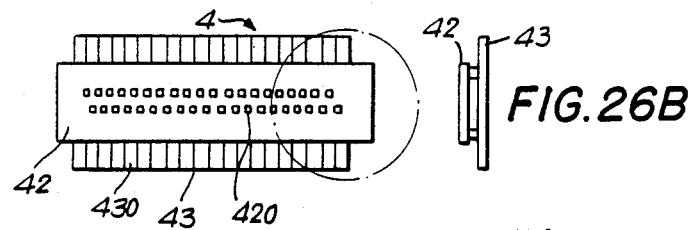
FIG. 26A
FIG. 26B
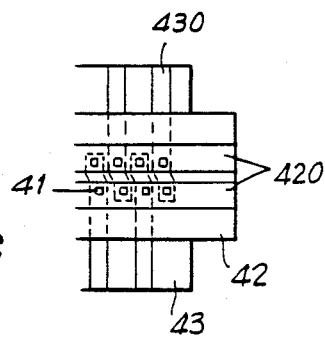
FIG. 26C
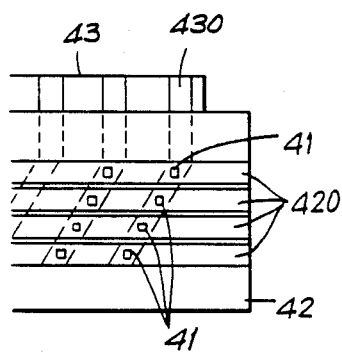
FIG. 27
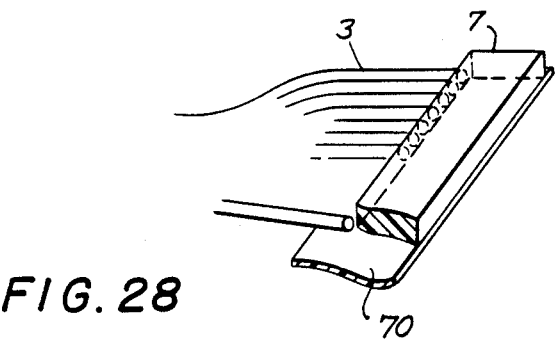
FIG. 28

FIG.29A   FIG.29B
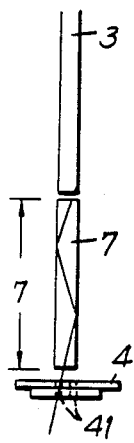   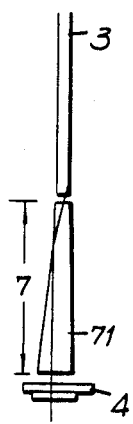   FIG.29C
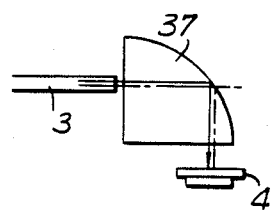
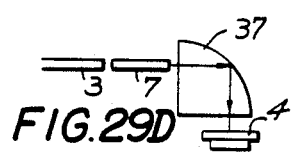   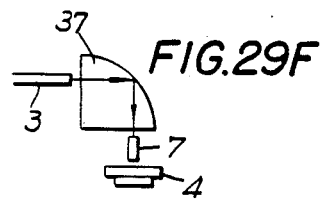
FIG.29D   FIG.29E   FIG.29F
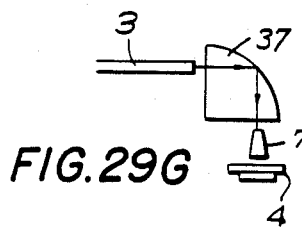   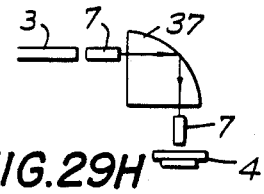   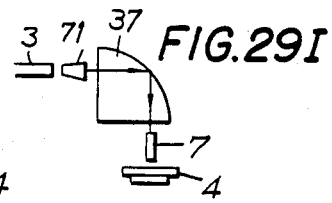
FIG.29G   FIG.29H   FIG.29I
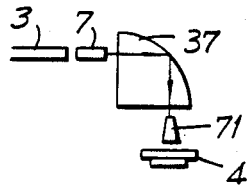   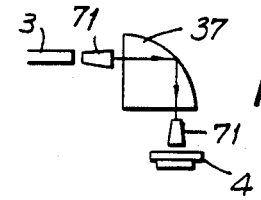
FIG.29J   FIG.29K FIG.30
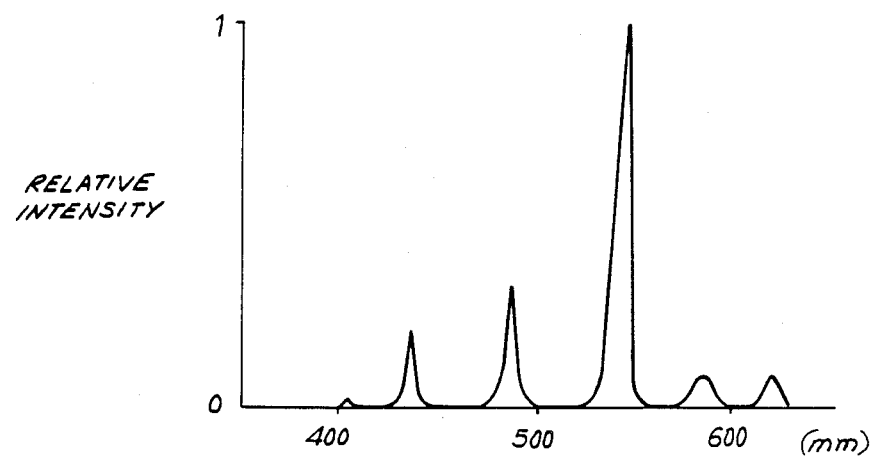
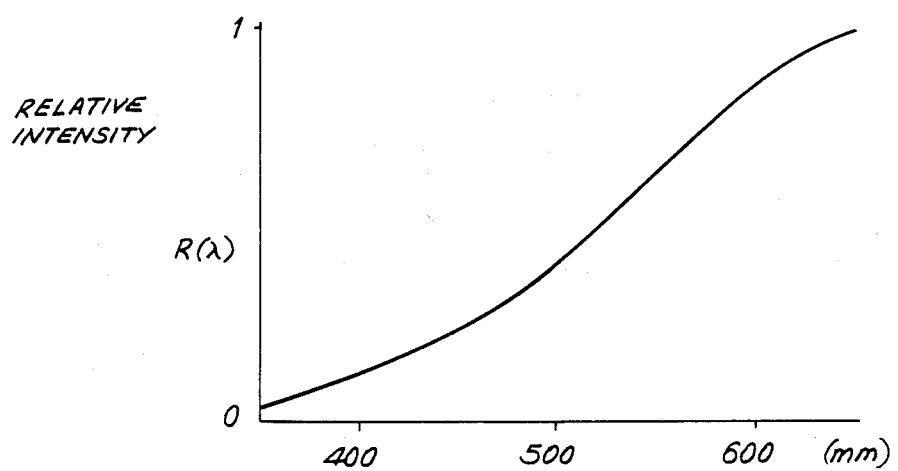
FIG.31

FIG.32
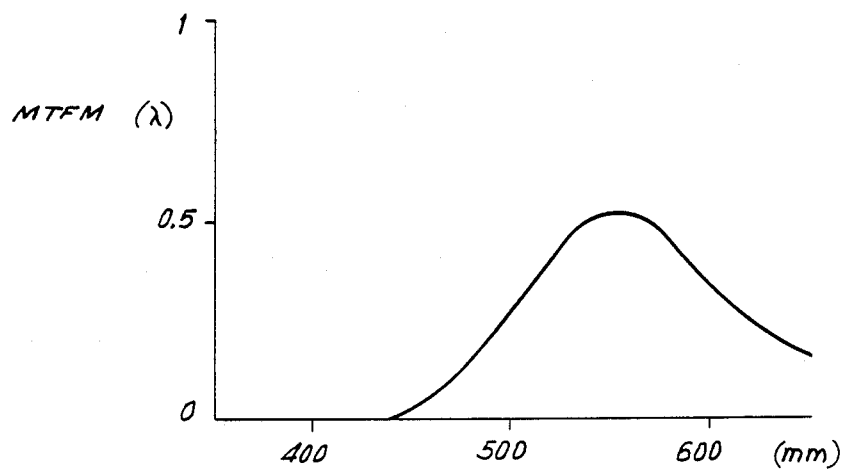
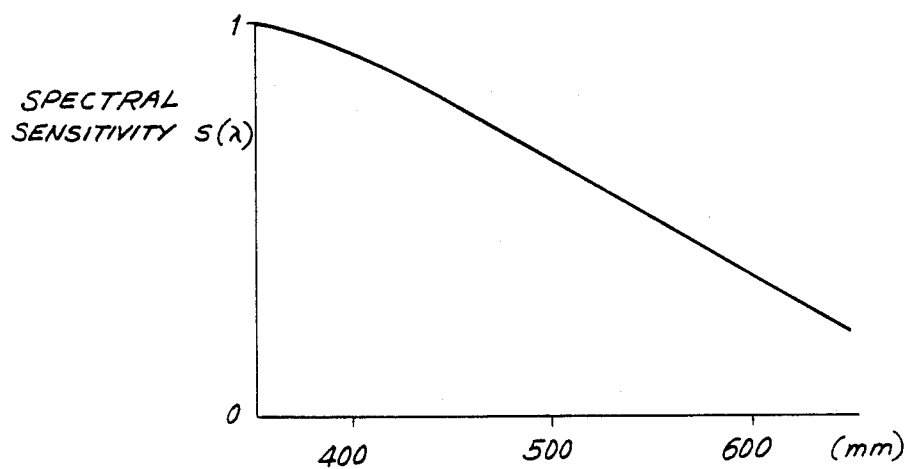
FIG.33

FIG. 41A
FIG. 41B
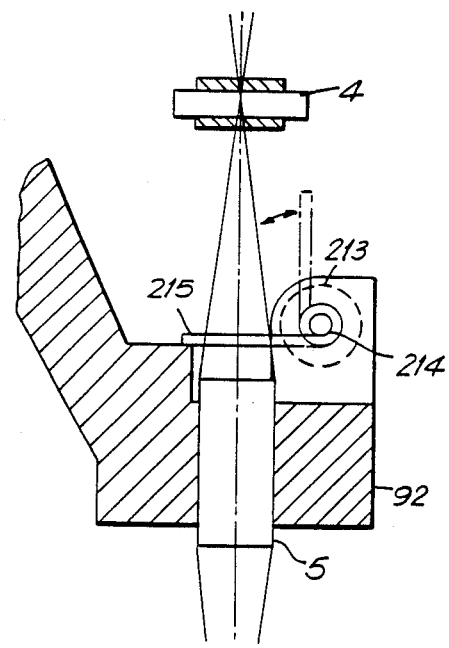
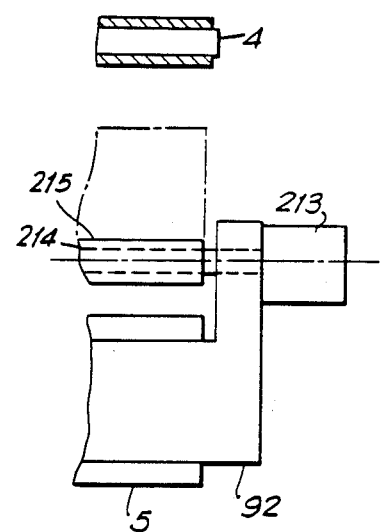

FIG.46A
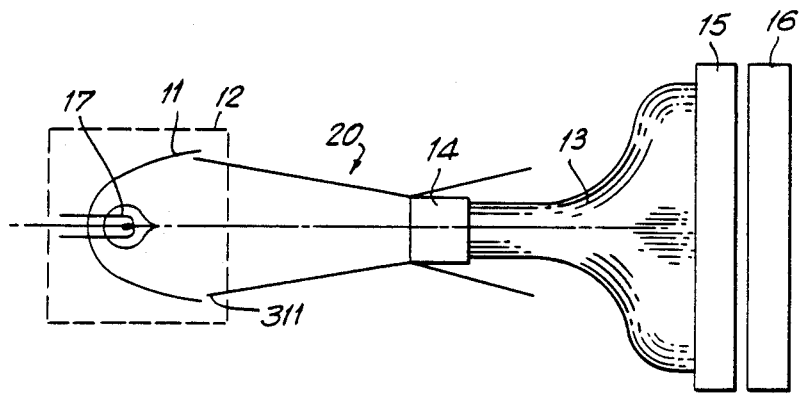
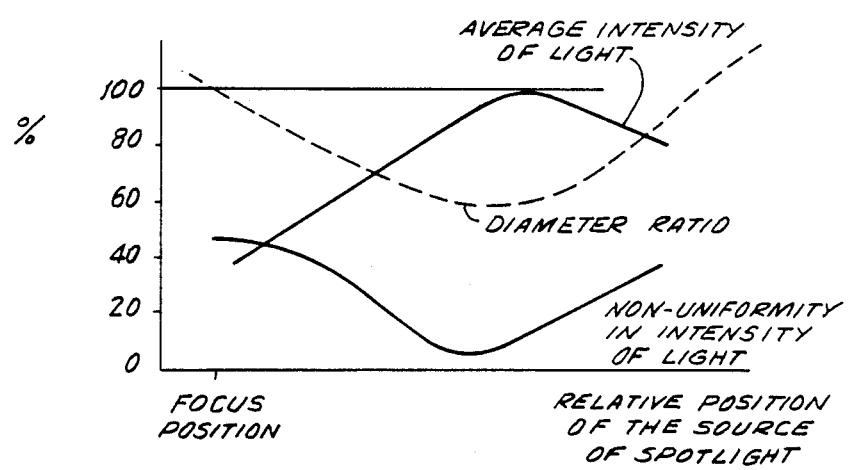
FIG.46B

PHOTOSENSITIVE PRINTING APPARATUS

BACKGROUND OF THE INVENTION

The invention is generally directed to a printing apparatus and in particular to a printing apparatus which has a light source and a liquid crystal, PLZT, electrochromic, or similar shutter window (microshutter) device which causes the transmission and interception of light to effect the printing of letters and pictures.

The rapid growth in the use of personal computers and word processors in business offices as well as homes has developed a need for a small output device or printer which maintains a high degree of resolution. Apparatus which use a photo-sensitive body for printing generally use the electro-static latent image on a cylindrical drum to print. Various devices, such as a corona discharge station, developing station, transfer station, and electricity removal station are radially disposed around the drum. In addition, a printing device with a plurality of shutter windows (microshutter) is also required on the drum. If a panel having shutter windows (microshutter) or a printing device containing such a panel is placed on the drum, a large diameter drum is required to permit the radial arrangement of the various other devices around the drum. This necessarily results in a large printing apparatus. Accordingly, there is a need for a printing apparatus which includes a small diameter photosensitive drum, a limited number of moving parts and provides accurate printing.

SUMMARY OF THE INVENTION

The invention is generally directed to a printing apparatus for use in a printer with a photo-sensitive drum. The printing apparatus includes a spotlight for generating light providing essentially a point source. A fiber optical converter converts the light from the spotlight to an array of linear rays of light. A plurality of shutter windows (microshutter), optically coupled to the fiber optical converter selectively transmit the light to selected positions in the array to the photo-sensitive drum. A light path is defined between the spotlight and the photo-sensitive drum through the fiber optical converter and shutter windows (microshutters). In addition, the printing apparatus can also include a fiber input light leveling system located in the light path between the spotlight and the fiber optical converter. The printing apparatus can also include a fiber output light leveling system located in the light path between the fiber optical converter and the shutter windows (microshutters).

The invention is also directed to an optical equalizing device for converting a spotlight source of light into a broadened beam of light with relatively constant light intensity across the width of the beam.

The invention is also directed to a device for converting a spotlight source into a substantially circular plane of light of substantially equal intensity across the entire width of the plane.

The invention is also directed to a printer which utilizes the printing apparatus described above in a xerographic process including a corona discharge station, developing station, transfer station and electricity removal station radially disposed around the photo-sensitive drum.

The invention is also directed to a light blending apparatus for blending light output from a fiber optical converter so as to provide a substantially equal intensity of light on an array of shutter windows (microshutters).

The invention is also directed to a circuit for driving a halogen lamp for use in a light printer with constant power and constant intensity.

The invention is also directed to a device for blocking the light generated by a spotlight in a liquid crystal microshutter device during liquid crystal refresh periods which obviate; the need to turn off the lamp which reduces the useful life of a halogen lamp bulb.

Accordingly, it is an object of the instant invention to provide an improved printing apparatus.

Another object of the invention is to provide an improved printing apparatus which includes a photo-sensitive drum having a small diameter and small overall size.

A further object of the invention is to provide a highly reliable printing apparatus by using only a small number of moving parts.

Still another object of the invention is to provide a printing apparatus which includes a spotlight source and an fiber optical converter for converting the spotlight to linear rays of light which are selectively radiated on a photo-sensitive drum by the opening and closing of shutter windows (microshutters) disposed in a linear pattern.

Another object of the invention is to provide an improved printer which utilizes a xerography process and which converts a spotlight source into substantially linear rays of light impacting shutter windows (microshutters).

Still another object of the invention is to provide an inexpensive, highly stable and substantially invariant intensity light transmission system for a printer utilizing a cylindrical drum, thereby providing a printing apparatus with a high degree of resolution and speed.

Another object of the invention is to provide an improved optical equalizing device for converting a spotlight source of light into a broadened beam of light with relatively constant light intensity across the width of the beam.

Yet another object of the invention is to provide an improved device for converting a spotlight source into a plane of light of substantially equal intensity across the width of a plane.

Yet a further object of the invention is to provide an improved printer including a photo-sensitive drum and a xerographic process which has a small overall size.

Still a further object of the invention is to provide an improved light blending apparatus for blending the light from the fiber optical converter of a printing apparatus prior to contacting the shutter windows (microshutters).

Yet another object of the invention is to provide a constant power driving circuit for a halogen lamp which causes the halogen lamp to provide a substantially constant intensity light.

Yet a further object of the invention is to provide an improved printing apparatus utilizing liquid crystal shutter windows (microshutters) which includes a light blocking device which selectively interrupts the light beam to allow the liquid crystals in the shutter windows (microshutter) array to be refreshed without turning the light source off.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 14 is a sectional view of a modified optical fiber input light leveling system constructed in accordance with the invention;

FIG. 15 is a graphical diagram comparing the relationship between non-uniformity in intensity of light and the spacing of a sensor relative to the axis of light for the embodiment of FIG. 14 and other embodiments;

FIG. 16 is a graphical diagram comparing the relative intensity of light and the spacing of a sensor relative to the axis of light for the fiber input light leveling system of FIG. 14 and other embodiments;

FIG. 17 is a graphical diagram comparing both the amount of relative light energy and the nonuniformity in the intensity of light for the embodiment of FIG. 14 with the focal length of the plano-concave lens in FIG. 14;

FIGS. 26A, 26B and 26C are a top plan, side elevational and a partial expanded top plan view of a shutter window (microshutter) panel for use in the printing apparatus where the shutter window (microshutter) is a liquid crystal panel;

FIG. 27 is a partial expanded top plan view of another liquid crystal shutter window (microshutter) constructed in accordance with the invention;

FIG. 28 is a perspective view of a portion of an fiber output light leveling system including a light guide;

FIGS. 29A, 29B, 29C, 29D, 29E, 29F, 29G, 29H, 29I, 29J, and 29K are sectional views of an fiber output light leveling system for a shutter window (microshutter) constructed in accordance with eleven embodiments of the invention;

FIG. 30 is a graphical diagram showing the spectral characteristics obtained by using a fluorescent lamp as a light source;

FIG. 31 is a graphical diagram showing the spectral characteristics obtained by using a halogen lamp as a light source;

FIG. 32 is a graphical diagram showing the chromatic aberration of a self-focussing fiber lens array;

FIG. 33 is a graphical diagram showing the spectral characteristics of a photo-sensitive drum;

FIGS. 41A and 41B are cut away sectional views of a light intercepting device constructed in accordance with a preferred embodiment of the invention;

FIG. 46A is a sectional view of a light generating system constructed in accordance with another embodiment of the invention;

FIG. 46B is a graphical diagram showing characteristics of the assembly of FIG. 46A;

DETAILED DESCRIPTION OF THE PREFERRED EMBODIMENTS

Figure 1:
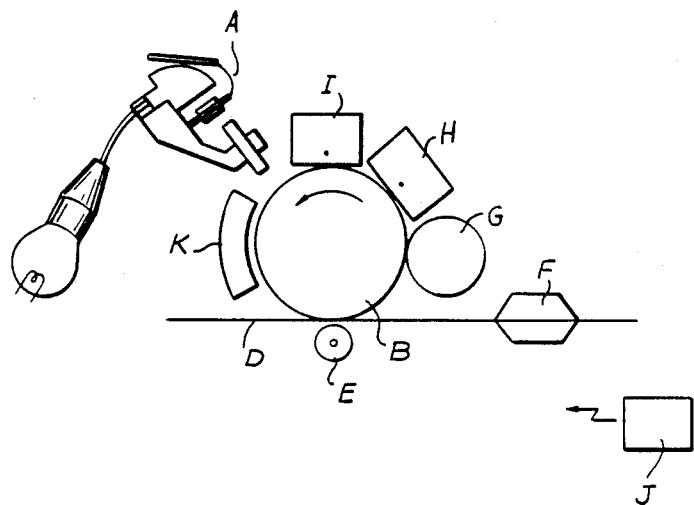
FIG. 1 is a schematic representation of a printer constructed in accordance with the invention.

Reference is made to FIG. 1 wherein a schematic representation of a printing apparatus generally indicated as A, constructed in accordance with the invention is shown. Printing apparatus A, a photo-sensitive drum B and a transfer corona discharger I are synchronously driven by a driving circuit J which is suitable for a desired printing speed. The signals representing the letters, numerals and figures to be printed are transmitted from an external source to apparatus A and converted by apparatus A to corresponding light signals. The light signals are transmitted to photo-sensitive drum B which rotates synchronously with the printing speed and the light signals remove the charge from that portion of drum B which they contact, thereby forming a latent image on drum B. The electrostatic latent image formed on drum B is developed by a developer K. Developer K may be of the magnetic roller type. The developed write signals or toner image is transferred by transfer corona discharger I on to recording paper D which travels synchronously with drum B. Light, heat and pressure, etc., applied to paper D by affixing device F fixes the toner on paper D. The remaining toner is removed from that portion of drum B from which the toner image has been transferred by a blade G. The image remaining on drum B is removed by a charge remover H which may, for example, include an AC corona discharger or lamp. The photo-sensitive drum B is, then, electrically charged by corona discharger I to wait for new optical write signals from printing apparatus A. Paper D is held in place against drum B by roller E. The cycle of operation is continously repeated until desired printing is completed.

A printing apparatus constructed in accordance with the invention includes a light source, a light valve, a circuit for driving the light valve, a light signal generator with an self-focusing optical fiber lens array that is, image forming lens, a photo-sensitive drum, a developer and an a fixing device. The light generating system includes a spotlight source which is typically a halogen lamp and a bundle of optical fibers having one end facing the halogen lamp with the other end of the bundle facing the light shutter windows.

Figure 2:
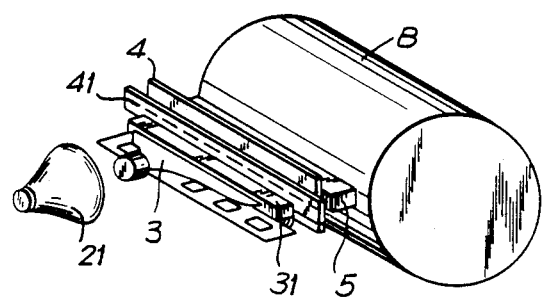
FIG. 2 is a perspective view of a light signal generator constructed in accordance with the invention.
Figure 3:
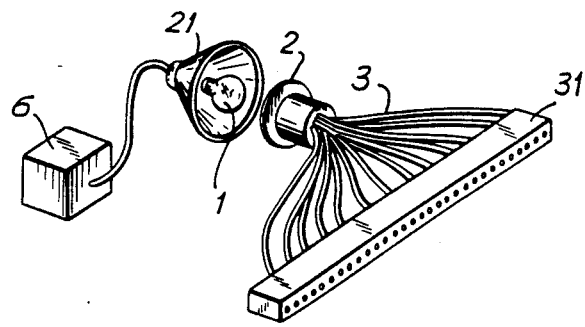
FIG. 3 is a partially exploded perspective view of a light signal generator constructed in accordance with another embodiment of the invention.

Reference is next made to FIGS. 2 and 3 wherein a light signal generator and light source are depicted. In FIG. 3, a halogen lamp 1 acts as a spotlight source which emits light flux which is focused by a condenser 2 which includes a reflector 21 or a lens. The focused light enters one end of a tight bundle of optical fibers 3. The other end of optical fibers 3 are disposed in a straight line and face shutter windows 41 (FIG. 2) of a liquid crystal panel 4 situated in a straight line so that light can be uniformly radiated onto the shutter windows. The light signals switched by the shutters are formed by a self-focusing optical fiber lens array 5 into an electo-static latent image on photo-sensitive drum B. In accordance with the invention, the light of halogen lamp 1 is efficiently focused and transmitted. As a result, the printing apparatus constructed in accordance with the invention only consumes a small amount of power, is compact and simple to assemble.

A power source 6 drives halogen lamp 1 to produce light which is reflected by reflector 21 to enter at one end of the bundle of optical fibers 3. The light leaving the output end 31 of bundle 3 of optical fibers is selectively transmitted by the opening and closing of shutter windows 41 (FIG. 2) in liquid crystal panel 4 so that an electro-static latent image can be formed on photo-sensitive drum B by self-focusing optical fiber lens array 5 (FIG. 2).

Figure 4:
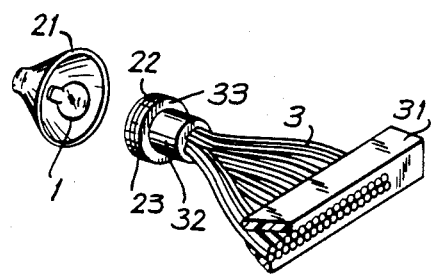
FIG. 4 is a partially exploded perspective view of a light signal generator constructed in accordance with another embodiment of the invention.

Reference is next made to FIG. 4 wherein the light source for illuminating liquid crystal panel 4 is shown by way of example. Halogen lamp (a spotlight source) 1 is a 100 W halogen lamp. Reflector 21 is a cold mirror reflector which transmits infrared rays, but reflects light having a shorter wavelength so that a maximum amount of light is obtained. A filter assembly includes an infrared cutting filter 22 for cutting heat rays to protect optical fibers 3 against damage by heat, and a band-pass filter 23 having a half-value width not exceeding 100 nm. Band-pass filter 23 transmits light at wavelength of about 400–600 nm so that it is possible to use a self-focusing optical fiber lens array 5 which is bright but has a refractive index which may widely vary with wavelength. As a result, photo-sensitive drum B can have a high degree of spectral sensitivity and shutter windows (liquid crystal shutters are preferred) 41 can quickly respond.

Optical fibers 3 are plastic fibers having a diameter of 250 $\mu$m which are tightly bundled at an input end 32 at which light enters the bundle. In order to obtain a uniform surface brightness at input end 32 a light diffusing plate 33 or a cylindrical (columnar) light conductor for preventing scattering loss of light is provided in front of input end 32. At the other end of the bundle which faces the liquid crystal shutters optical fibers 3 are tightly aligned in two rows. This end of the bundle is very accurately positioned with a dimensional deviation of only several tens of microns relative to the liquid crystal panel. To achieve this accurate positioning, the end of the bundle is inserted over positioning pins provided on a chassis for the liquid crystal panel and secured by screws to the chassis. The light signals switched by liquid crystal panel 4 and an optical reflection system are focused by a self-focusing optical fibers lens array 5 to impart sufficient amounts of light energy to photo-sensitive drum B. Variations in the amount of light energy supplied by the light source are kept at or below twenty percent. When xerography is used for image formation, clear printing can be obtained with this variation in light.

Infrared cutting filter 22, which is used to filter out heat rays, is not always required. It can be omitted without causing any adverse effects on the printing process.

A spotlight source, such as a halogen lamp can produce linear rays of light using a conversion system which creates linear rays of light from a point source. Optical fibers 3 which are used in the system may either be formed of plastics or of glass. It is possible to use, for example, plastic fiber composed an acrylic core and a teflon sheath having a diameter of 0.75 mm.

Figure 5A:
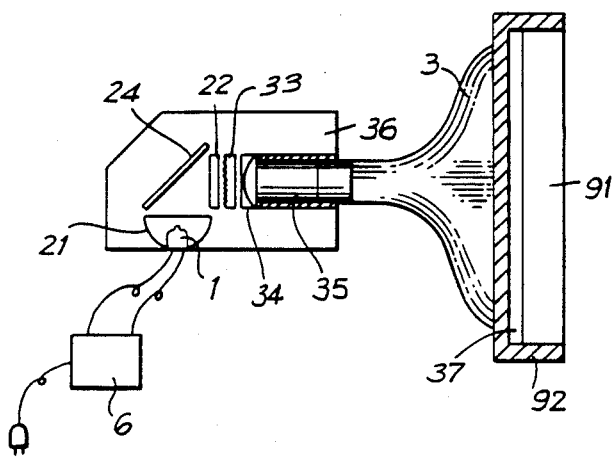
FIGS. 5A and 5B are top plan and front elevational views of a light generating system including an oval mirror constructed in accordance with another embodiment of the invention.
Figure 5B:
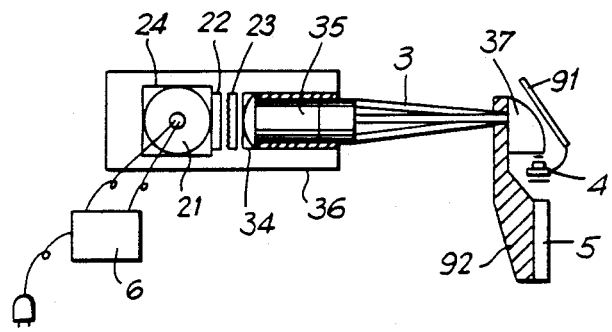

Reference is next made to FIGS. 5A and 5B wherein a light signal generator constructed in accordance with the invention is depicted. FIG. 5A is a top plan view of the light signal generator and FIG. 5B is a front elevational view thereof. A halogen lamp 1 with a reflector preferably dichroic multimirror 21 is driven by a high-frequency power source 6. The light generated by lamp 1 is reflected by a mirror 24 having a layer, for example, of aluminum or silver formed on a substrate such as glass or a metal plane by sputtering or evaporation. The light then passes through an infrared cut filter 22 which cutting light having a wavelength exceeding about 700 nm, and is diffused by a light diffusing plate 33. The diffused light passes through a plano-concave lens 34 into an integrating cylinder 35 in which further diffusion produces smooth light with minimal brightness variation. Halogen lamp 1, dichroic multimirror 21, mirror 24, infrared cutting filter 22, light diffusing plate 33 plano-concave lens 34 and integrating cylinder 35 are located in a lamp housing 36. The light leaving integrating cylinder 35 enters a bundle of optical fibers 3 having an input end at which the fibers are bundled so as to have a circular cross-section. The output end of the bundle of fibers has the fibers spread out in a line. The light leaving optical fibers 3 is reflected by an oval mirror 37 acrylically treated for total reflection causing the reflected light to enter a liquid crystal panel 4 having a plurality of shutter windows 41 which are opened and closed by a control device mounted on a board 91. The light selectively transmitted through shutter windows 41 forms a latent image on a photo-sensitive body such as a drum using a self-focusing optical fiber lens array 5. A molded plastic body 92 holds oval mirror 37, panel 4 and self-focusing optical fiber lens array 5.

Figure 6:
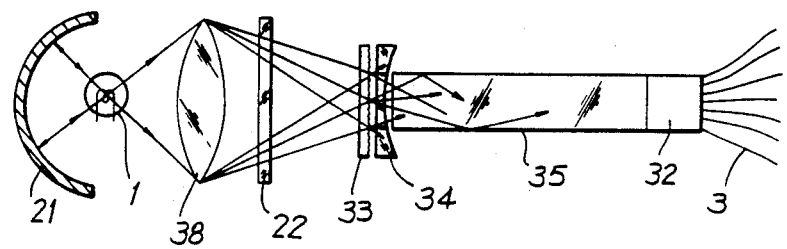
FIG. 6 is a sectional view of another embodiment of a light generating system, showing various light paths constructed in accordance with another embodiment of the invention.

Reference is next made to FIG. 6 wherein a light signal generator constructed in accordance with another embodiment of the invention which includes an optical light source system for a light guide is depicted. The system includes a spotlight source, an optical focusing system and an fiber input light leveling or fiber input light leveling system. The leveling system includes a diffusing plane, a concave lens and a cylindrical reflecting mirror. The diffusing plane and the concave lens are disposed in the area where the light emitted by the spotlight source is focused by the converging system. A cylindrical mirror is disposed between the diffusing plane and the concave lens and has a longitudinal axis coinciding with the axis of the light. The lens is a plano-concave lens having at least one scattering surface, which serves to diffuse the light, is capable of removing infrared rays and is heat resistant.

In FIG. 6 the halogen lamp which acts as a spotlight source 1 includes a 12 volt, 50 watt halogen lamp. The focusing system includes a mirror reflector (preferably a concave mirror) 21 and a focusing lens 38. An infrared cutting filter 22 reflects infrared light having wavelengths up to about 700 nm. Diffusing plate 33 is a plate of white glass ground appropriately with sand and thereby capable of diffusing light. A plano-concave lens 34 has a focal length of −100 mm. An integrating cyclinder 35 of acrylic material has a length of about 60 mm. and has a cylindrical total reflection mirror defined by the difference in reflective indicies between air and the cylinder. The light guide comprises a bundle of 300 optical fibers, each having a diameter of 1 mm and an input end 32. It is sufficient for light diffusing plate 33 to diffuse light to the extent that the filament image arriving from the self-focusing optical fiber lens system does not clearly appear. Plano-concave lens 34 improves the orientation of the incident light. As a result, the fiber input light leveling system uses the light flux in a highly efficient manner.

Figure 7:
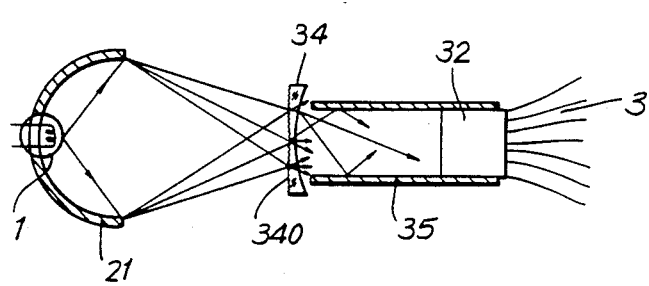
FIG. 7 is a sectional view of a light generating system, showing a plurality of light paths constructed in accordance with another embodiment of the invention.

Reference is next made to FIG. 7 wherein a modified optical fiber input light leveling system for a light guide constructed in accordance with the invention is depicted. Spotlight source 1 is a 12 volt 100 watt halogen lamp. Reflecter 21 is composed of a multiplicity of small plane mirrors defining as a whole a mirror having a paraboloid of revolution and capable of focusing light, while making the filaments of light appropriately less clear. A diffusing surface 340 is formed on one side of a concave lens 34 by embossing with a press treated with sand. Plano-concave lens 34 is formed from heat resistant glass capable of absorbing heat rays and has a focal length of about −150 mm. Aluminum integrating cylinder 35 has a length of about 40 mm and defines a cylindrical reflecting mirror. The light guide includes a bundle of 600 plastic optical fibers having a diameter of 0.75 mm and has an input end 32.

The fiber input light leveling system of FIG. 7 is inexpensive to manufacture and requires only a small space to install since the infrared cutting filter, light diffusing plane and plano-concave lens are formed as a single part 34. Due to a decrease in the number of interfacial surfaces from six in the fiber input light leveling system of FIG. 6 to two in the system of FIG. 7, the fiber input light leveling system of FIG. 7 has a smaller surface reflection loss and thereby an increase of nearly 18% in efficiency of translating light intensity.

Figure 8:
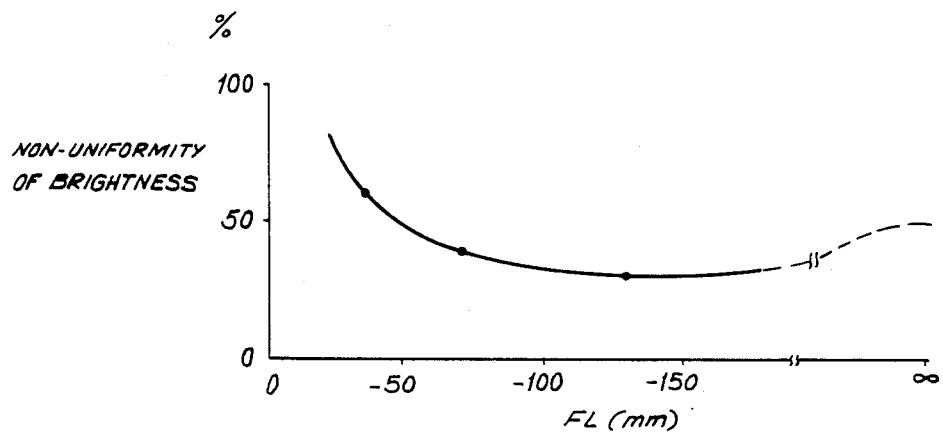
FIG. 8 is a graphical diagram showing the relationship between the non-uniformity of brightness of light at the outlet of a tube and the focal length of a concave lens.

The optimum focal length of plano-concave length 34 depends on the degree of diffusion in a plane of uneven diffusion behind the filaments, the length of the cylindrical reflecting mirror, the allowed angle of incident light of the optical fibers and the tightness of the bundle of optical fibers. FIG. 8 is a graph showing the relationship between the focal length of the lens and the non-uniformity of brightness of the optical fibers, at the output end of the light guide for the system of FIG. 7. The non-uniformity of brightness is a function of the unevenness in brightness between individual optical fibers.

Figure 9:
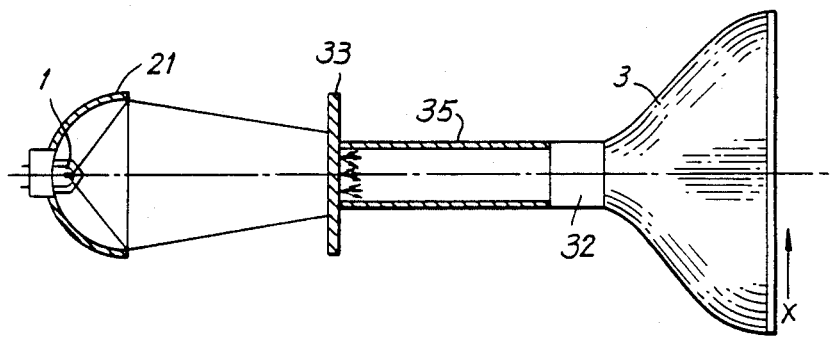
FIG. 9 is a sectional view of a light generating system constructed in accordance with another embodiment of the invention depicting various light rays.

Reference is next made to FIG. 9 wherein a light signal generator constructed in accordance with another embodiment of the invention is depicted. The optical light source system for the light guide includes a spotlight source 1, an optical focussing system and a fiber input light leveling system. The optical focussing system includes a reflector 21 formed by a dichroic-concave mirror having a diameter of 50 mm and a focal length of 60 mm. The fiber input light leveling system includes a light diffusing plate 33 and an integrating cylinder 35 which has cylindrical reflecting surface. The light guide includes a bundle of 600 plastic optical fibers 3 having a diameter of 0.75 mm and bundled at one end within a cylinder with an inside diameter of 20 mm. At the other end, plastic optical fibers 3 spread to an opening angle of thirty degrees and lie in two planes. Spotlight source 1 is a 100 watt halogen lamp. Integrating cylinder 35 is made of aluminum with an inside diameter of 20 mm. Integrating cylinder 35 has a chemically polished inner reflecting surface and is connected to optical fibers 3.

Aluminum intergrating cylinder 35 is less expensive and easier to obtain and work than a cylinder made of gold or silver. Aluminum has a higher degree of reflectivity than nickel or chromium and causes a smaller loss of light by reflection. No light is transmitted from the cylinder to parts of the input end of the light guide if the diameter $L_1$ of the cylindrical reflecting surface is smaller than the diameter $L_2$ of the outside circumference of the input end of the light guide. Therefore, it is essential that $L_1$ be equal to, or larger than $L_2$. In the system of FIG. 9, $L_1$ is equal to $L_2$.

In the fiber input light leveling system of FIG. 9 the reflecting surface of aluminum intergrating cylinder 35 forms a plurality of virtual images from light diffusing plate 33. Therefore, a reduction in variation of the intensity of light between individual optical fibers in the bundle is achieved while keeping the loss of light at a level at or below ten percent.

Figure 10:
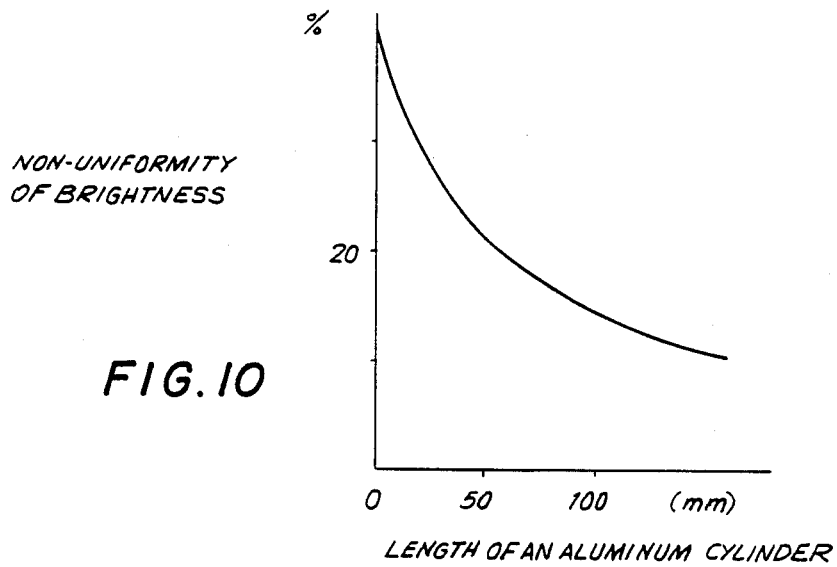
FIG. 10 is a graphical diagram showing the relationship between the length of an aluminum integrating cylinder in the system of FIG. 9 and the non-uniformity in intensity of light.

Reference is next made to FIG. 10 which is graph showing the relationship between the non-uniformity of brightness of light at the output end of optical fibers 3 in the fiber input light leveling system of FIG. 9 and the length of aluminum intergrating cylinder 35. The non-uniformity in the amount of brightness of light is expressed by the ratio $(E_{max}-E_{min})/E_{AV}$, in which $E_{max}$ is the maximum value of intensity, $E_{min}$ is the minimum value and $E_{AV}$ is the average value in a relative light intensity distribution obtained by scanning across the output end of the light guide in the direction of arrow X in FIG. 9.

While the graph shows a maximum variation in non-uniformity in the intensity of light when aluminum intergrating cylinder 35 has a length of 0 mm. (no cylinder is used), an increase in the length of the cylinder brings about an increase in the number of virtual images formed by the reflecting surface and thereby a reduction in the variation. It is therefore obvious from FIG. 10 that it is possible to design the aluminum cylinder with any desired length depending upon the tolerable non-uniformity in intensity of light.

Figure 11:
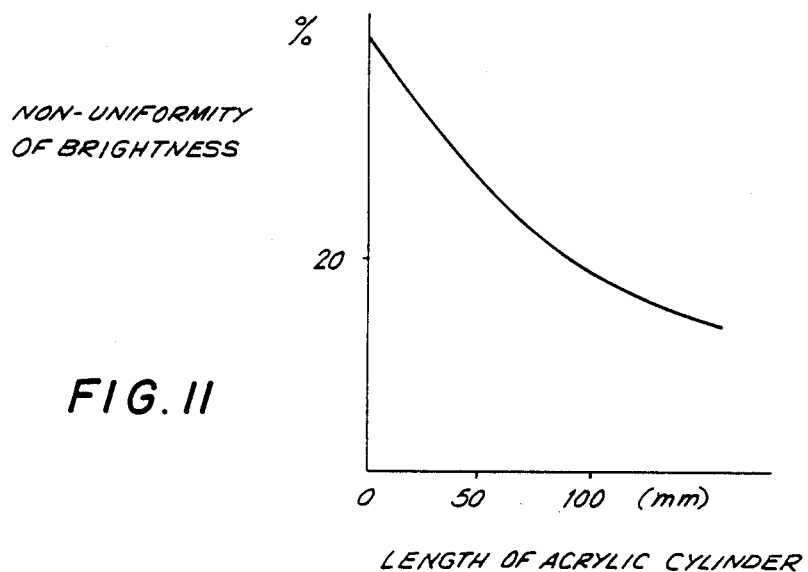
FIG. 11 is a graphical diagram showing the relationship between the length of an acrylic integrating cylinder in the system of FIG. 6 and the non-uniformity of brightness of light.

FIG. 11 is a graph showing the non-uniformity of brightness of light at the output end of the light guide in the system of FIG. 6 in relation to the length of acrylic cylinder 35. Acrylic integrating cylinder 35 defines a shorter optical path than does an aluminum cylinder of the same length, but gives results similar to those shown in FIG. 10 where equal optical paths are involved.

Figure 12:
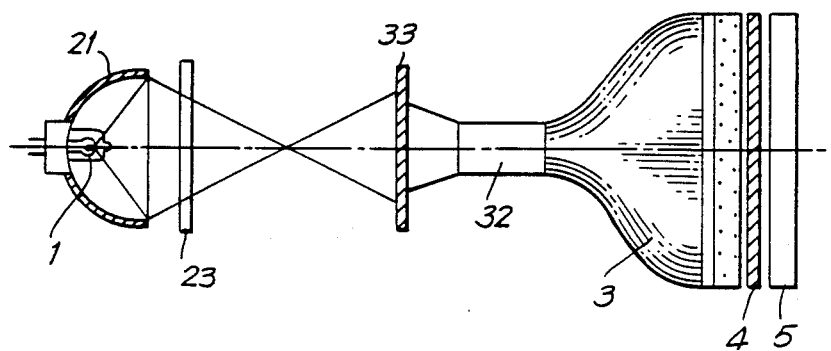
FIG. 12 is a sectional view of a light generating system constructed in accordance with another embodiment of the invention showing light ray patterns.

Reference is next made to FIG. 12 wherein a light signal generator constructed in accordance with another embodiment of the invention is depicted. The light signal generator of FIG. 12 includes a light diffusing plate 33 positioned on the defocussing side of reflecter 21. This arrangement makes it possible to achieve a uniform emission of light from the whole area defined by the opening angle of tight bundle of optical fibers 3 and thereby reduce the variation and the intensity of light.

Figure 13:
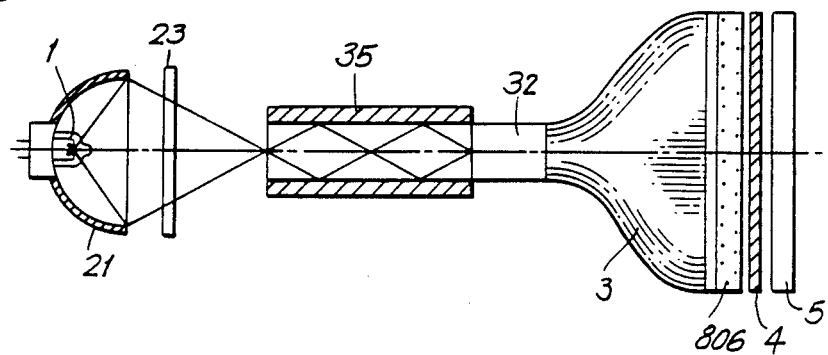
FIG. 13 is a sectional view of a light generating system constructed in accordance with another embodiment of the invention showing light ray paths.

Reference is next made to FIG. 13 wherein another embodiment of the light signal generator constructed in accordance with the invention is depicted. The light signal generator of FIG. 13 includes an integrating cylinder 35 having an inner reflecting surface. Integrating cylinder 35 is disposed in the vicinity of the focal point of a reflector 21. This arrangement enables optical fibers 3 to receive a plurality of virtual images of the light source from the reflecting surface of the cylinder and thereby makes it possible to reduce the non-uniformity of intensity of light at the output end of the optical fibers.

In the system of FIG. 13, light source 1 is a 50 watt halogen lamp. A band-pass filter 23 is a green filter having a principal wavelength of 550 nm which is a half value width of 80 nm. Reflecter 21 is a diochroic concave mirror having a diameter of 50 mm and has a focal length of 32 mm. The fiber input light leveling system includes an integrating cylinder 35 made of aluminum with an inside diameter of 17 mm which is connected to a fiber optical converter system which includes a bundle of 220 plastic optical fibers 3 each having a diameter of 1 mm. An acrylic light guide 806 having a thickness of 0.8 mm, a width of 20 mm and a length of 220 mm is disposed after optical fibers 3 to transmit light energy to a liquid crystal panel array 4 while substantially equalizing the intensity of light. Self-focusing optical fiber lens array 5 has an entry angle of 20 degrees and a total conjugate length of 17 mm. The system enables a final MTF value of about 45 percent at 5 lines per millimeter (1 pm). Light guide 806 has a mirrored finish on all six sides so that the longitudinal total reflection may also be utilized to make an effective use of the light flux.

The use of an acrylic cylinder as the fiber input light leveling system is particularly beneficial because the acrylic absorbs only a small amount of light and as a result transmits a larger amount of light than any other transparent material. A far smaller loss of light energy is suffered than with other materials conventionally used such as BK-7 or white plate glass.

In the system described above, the optical fibers receive a plurality of virtual images of a diffusing plate from the total reflection surface defined between the exterior wall of acrylic cylinder 35 and the ambient air. As a result, the system enables a reduction in the non-uniformity of light brightness across all of the optical fibers and reduces the loss of light energy to a level at our below 10 percent.

Reference is next made to FIG. 14 wherein an fiber input light leveling system constructed in accordance with another embodiment of the invention is depicted. A spotlight source 1 is a halogen lamp located at the center of semispherical multimirror construction reflecter 21. A mirror 24 has an image reflecting surface formed by the evaporation of aluminum which reflects light from halogen lamp 1 to an integrating cylinder 35. Mirror 24 has a base which may be formed from plastics or a glass plate. An infrared cutting filter 22 removes the infrared portion of the light which is transmitted to optical fibers 3. A light diffusing plate 33 diffuses the light transmitted to optical fibers 3. A plano-concave lens 34 and an integrating cylinder 35 cooperate to reduce the variation in intensity of light. While integrating cylinder 35 may be plastic cylinder having an inner reflecting surface, a cylinder of a metal, such as aluminum, copper or iron is preferable from the standpoint of allowing the bundled end of optical fibers 3 to cool effectively.

It is desired to utilize an fiber input light leveling system which reduces any unevenness of brightness at the input end of the microshutters while preventing any substantial loss of light energy. FIG. 15 is a graph showing the results of tests conducted to ascertain the relationship between non-uniformity in intensity of light and the location of a sensor relative to the axis of light. The results obtained by using only a spotlight source 1 and an integrating cylinder 35 are shown by a curve marked with circles. The results obtained by adding a light diffusing plate 33 are shown by a curve marked with triangles and, finally, the results obtained by also adding a plano-concave lens 34 are shown by a curve marked with solid circles.

FIG. 16 is a graph showing the results of tests conducted to determine the amount of relative energy corresponding to the location of the sensor along the axis of light. The results shown in FIGS. 15 and 16 confirm the superiority of the system having a spotlight source, a diffusing plate and an integrating cylinder or a system also including a plano-concave lens in front of the cylinder. Plano-concave lens 34 used for the tests shown in FIGS. 15 and 16 had a focal length of −130 mm.

Reference is next made to FIG. 17 wherein a graph showing the relationship between the focal length of plano-concave lens 34 and the non-uniformity in intensity of light and amount of relative light energy is depicted. As is clear from FIG. 17, it is preferable to use a lens having a focal length of at least 75 mm. It is more preferable to use a plano-concave lens 34 having a focal length in the range of 130 to 150 mm. An optimum focal length is in the range between 130 to 150 mm. Light diffusing plate 33 was a blasted glass plate having a surface roughness of 9 microns. Light diffusing plate 33 may alternatively be formed from a glass or plastic plate containing bubbles or a white substance. Infrared cutting filter 22 is a plate of heat absorbing glass having a thickness of 1 mm and coated with an infrared reflecting film. Infrared cutting filter 22 has a cutoff frequency of about 700 nm. Although the dichroic concave mirror for halogen lamp 1 has a varying cutoff frequency, a definite frequency range is used for infrared cutting filter 22.

In the system described above, four places between spotlight source 1 and integrating cylinder 35 are likely to cause a loss of light energy by absorption or surface reflection. It is therefore beneficial to omit one or more of these parts or employ parts which have a plurality of these functions to minimize the energy loss. For example, it is possible to omit mirror 24 and dispose spotlight source 1 in coaxial relation with integrating cylinder 35. Light diffusing plate 33 can be omitted if a diffusing function is departed to infrared cutting filter 22. Alternatively, light diffusing plate 33 can be omitted if plano-concave lens 34 has a diffusing power. It is also possible to simplify the system and thereby improve its light transmission efficiencies if plano-concave lens 34 is formed from heat absorbing glass, has a plane surface coated for reflecting heat rays and a frosted concave surface. Infrared cutting filter 22, light diffusing plate 33 and plano-concave lens 34 can, of course, be disposed in any other order. It is therefore possible to dispose them in six different orders. It is also possible to reduce the variation in intensity of light more effectively if the optical fibers are inclined in a random fashion at the output end of the bundle.

Figure 18:
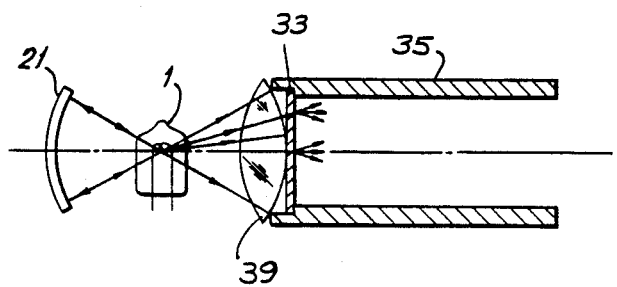
FIG. 18 is a sectional view showing light rays of a light generating fiber input light leveling system constructed in accordance with another embodiment of the invention.

Reference is next made to FIG. 18 wherein a fiber input light leveling system constructed in accordance with another embodiment of the invention is depicted. A reflector 21 is formed from a spherical mirror having its center at a spotlight source 1 to enable effective use of the radiated light flux. A lens 39 collects the light from source 1 and the reflected light and converts this light to light flux with a maximum effective angle of dispersion. As the flux travels parallel to the optical axis, it is possible to achieve an effective dispersion of the flux even if light diffusing plate 33 has a small diffusion power. The addition of an integrating cylinder 35 provides for an improved optical leveling system.

Figure 19:
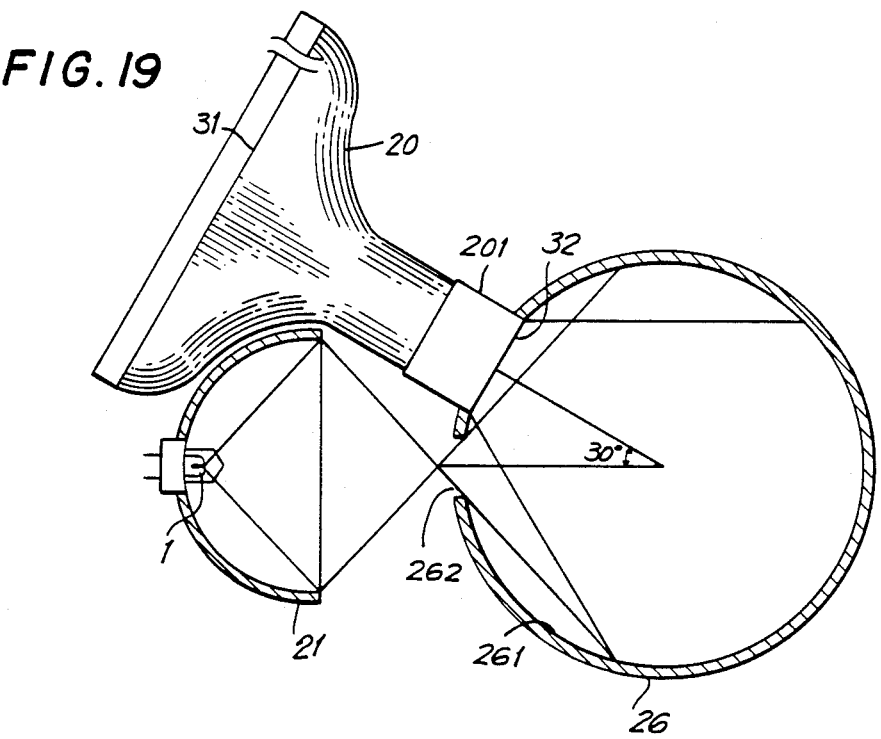
FIG. 19 is a sectional view of a light generating fiber input light leveling system, constructed in accordance with another embodiment of the invention showing light ray paths.

Reference is next made to FIG. 19 where another light source system for converting a spotlight to linear rays of light in accordance with the invention is depicted. The system of FIG. 19 includes a spotlight source 1 in an fiber input light leveling system which is characterized by an integrating sphere 26 having an inner wall surface 261 which defines a diffusing surface of uniform reflectivity. The system converts a spotlight source to linear rays in a bundle of 600 plastic optical fibers having an opening angle of thirty degrees and a diameter of 0.75 mm. The bundle of wires is held together in a cylinder 201 having an inside diameter of 20 mm at the first end of the optical fibers while the optical fibers spread outward at the other end of the bundle and are disposed in two rows.

Spotlight source 1 is a 100 watt halogen lamp. Integrating sphere 26 is 75 mm in diameter and has an inner wall surface 261 coated uniformly with magnesium oxide. Halogen lamp 1 has a diameter of 10 mm. Integrating sphere 26 has an inlet opening 262 for receiving light from halogen lamp 1. Optical fiber system 20 and inlet opening 262 have an angle of thirty degrees therebetween. A reflector 21 achieves more effective use of the light from halogen lamp 1. Reflector 21 is a dichroic concave mirror having a diameter of 50 mm and a focal length of 32 mm. Magnesium oxide has a large diffusing power and a high degree of reflectivity and forms a substantially perfect diffusing surface on inner wall surface 261 of integrating sphere 26.

The total intensity of light ($E_P$) at a particular point of the inner surface of integrating sphere 26 is equal to the intensity ($E_{P0}$) of light emitted directly from halogen lamp 1 plus the intensity ($E_{P'}$) of light produced by the mutual reflection of various points of the diffusing surface ($E_P = E_{P0} + E_{P'}$). The value of $E_{P0}$ differs from one point to another on the inner surface of intergrating sphere 26 due to the lack of uniformity in intensity of light emitted by halogen lamp 1. Therefore, if integrating sphere 26 has an inlet opening for light in an area within the opening angle of optical fibers 3, the light of halogen lamp 1 is transmitted directly to optical fiber system 20 and a non-uniformity in intensity of light occurs across the output end of optical fiber system 20. It is therefore essential that inlet opening 262 be provided outside the opening angle of optical fibers 3 as is shown in the embodiment of FIG. 19.

The light entering integrating sphere 26 is reflected at least once by its inner diffusing surface and transmitted to optical fiber system 20. The intensity of light at a given point of the input end 32 of optical fiber system 20 is expressed by the following equation:

$$E_P = E_{P'} = F \times \rho / S(1-\rho)$$

where S is the surface area of the diffusing surface of the sphere (m²) and $\rho$ is the reflectivity of the diffusing surface. The value of $E_P$ is proportional to the total flux F (lumens) of light entering integrating sphere 26. As F is primarily a constant, the value of $E_P$ is constant. Therefore, the input end 32 of optical fiber system 20 provides a surface of uniform light intensity within the opening angle of optical fibers 3. This makes it possible to reduce the non-uniformity in intensity of light at the output end 31 of light guide optical fiber system 20.

Figure 20:
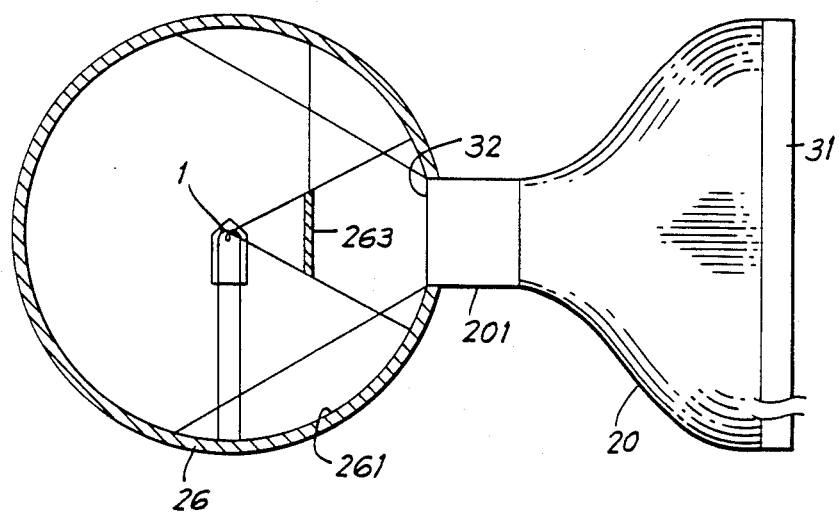
FIG. 20 is a sectional view of a light generating fiber input light leveling system, constructed in accordance with another embodiment of the invention showing light ray paths.

Reference is now made to FIG. 20 wherein an optical light source system for converting a spotlight source to linear rays of light constructed in accordance with another embodiment of the invention is depicted. A 100 watt halogen lamp 1 is used as spotlight source 1. The optical leveling system includes an integrating sphere 26 with a diameter of 75 mm. and having an inner wall surface 261 uniformly coated with magnesium oxide. Lamp 1 is positioned in the center of integrating sphere 26 which is connected to an optical fiber light guide system 20. A light shielding plate 263 having a diameter 15 mm and coated with magnesium oxide is provided between halogen lamp 1 and optical fiber system 20 within the opening angle of optical fibers 3 at the input end 32 of optical fiber system 20 so that the light from halogen lamp 1 is not directly transmitted to optical fiber system 20. As a result, the light from halogen lamp 1 is reflected at least once by the inner diffusing surface of intergrating sphere 26 prior to entering optical fiber system 20. This makes it possible to significantly reduce the non-uniformity in intensity of light at output end 31 of optical fiber system 20.

Figure 21:
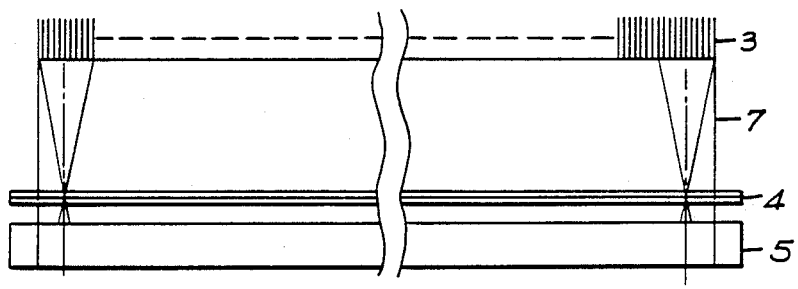
FIG. 21 is a sectional view of an integration chamber in a light guide constructed in accordance with the invention.

Reference is next made to FIG. 21 wherein a fiber output light leveling system located at the inlet of a microshutter device and including a light guide 7 in accordance with another embodiment of the invention is depicted. It is preferable that the light entering each shutter window 41 in liquid crystal panel 4 be transmitted from at least five optical fibers 3, as shown in FIG. 21. This makes it possible to better equalize the intensity of light entering all of shutter windows 41 even if optical fibers 3 may differ from one another in the efficiency of light transmission or the degree of inclination of their optical axis to the shutter window or even if some optical fibers are damaged.

An oval mirror 37 (FIG. 25) can be used instead of light guide 7. It is also effective to use a tapered light guide which widens in thickness from the input end to the output end. This facilitates the transmission of light from a plurality of optical fibers 3 to each shutter window 41.

While it is, of course, preferable that light be transmitted from as many optical fibers 3 as possible to each shutter window, this results in an increase in the distance from the fibers to the microshutter. Optimally, it is advisable to utilize up to thirty optical fibers for transmitting light to each shutter window. However, more practically, it is advisable to use 10 to 20 fibers. If the light guide has a width of 16 mm, about twelve optical fibers 3 transmit light to each shutter window.

If optical fibers 3 are disposed in a plurality of rows at the output end of the optical fiber system, it is possible to reduce the width of the light guide, while utilizing an equal number of fibers for transmitting light to one shutter window. If the width of the light guide is unchanged, the use of optical fibers disposed in a plurality of rows for transmitting light to each shutter window contributes to a reduction in non-uniformity of light intensity.

Figure 22:
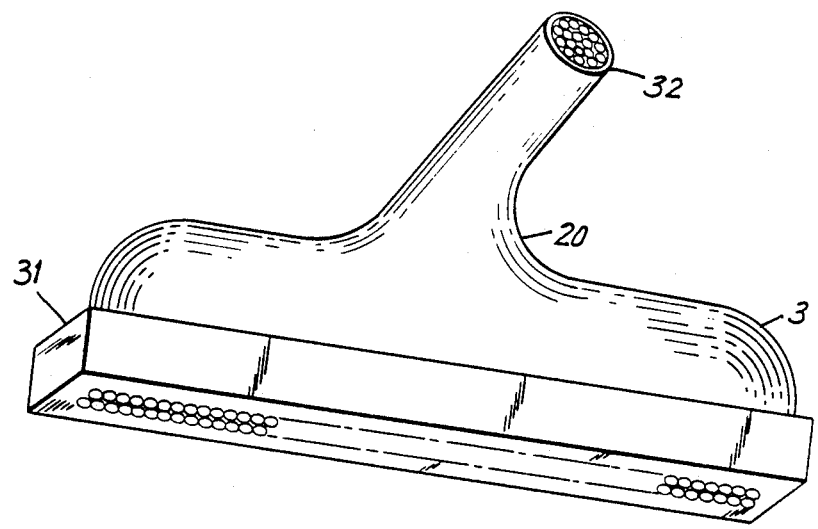
FIG. 22 is an enlarged perspective view of an optical fiber optical converter system including two rows of optical fibers at the light outlet end of the fiber optical converter system.

FIG. 22 shows by way of example a optical fiber system 20 having an input end 32 and an output end 31 in which optical fibers 3 are disposed in two rows.

Figure 23:
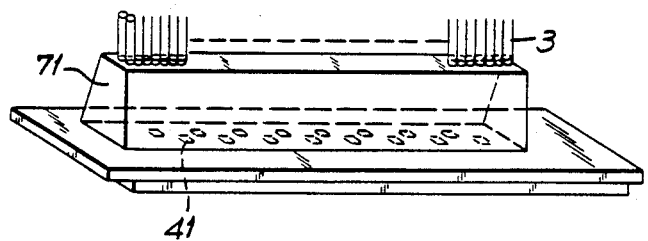
FIG. 23 is a perspective view of a portion of an fiber output light leveling system including a tapered guide constructed in accordance with another embodiment of the invention.

Reference is made to FIG. 23 wherein a tapered light guide 71 is shown by way of example. The thickness of tapered light guide 71 at the input end, at which optical fibers 3 are connected to tapered light guide 71, is less than at the output end coupled to shutter windows 41. If shutter windows 41 are provided in a plurality of rows, it is usually necessary to dispose the optical fibers in a plurality of rows covering the entire width of the array of shutter windows 41. To increase the width of the aperture array cells requires a larger number of rows of optical fibers 3. This is, however, not necessary if a tapered guide is used. The tapered guide provides uniform transmission of light to all of shutter windows even if optical fibers 3 are disposed in an array not covering the entire width of the aperture array. Tapered light guide 71 may have a taper angle of between of about 2-10 degrees. It is, for example, efficient to use a tapered guide formed from an acrylic resin having an input and thickness of 0.7 mm and a taper angle of two degrees.

Figure 24:
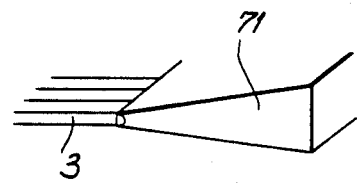
FIG. 24 is a perspective view of a portion of an fiber output light leveling system including a single row of optical fibers and a tapered guide constructed in accordance with another embodiment of the invention.

FIG. 24 depicts a tapered light guide 71 to which a single row of optical fibers 3 is connected. Tapered light guide 71 may also have the reverse construction. That is, the tapered guide may taper from a thick input end connected to optical fibers 3 to a thinner output end connected to shutter windows 41.

Figure 25:
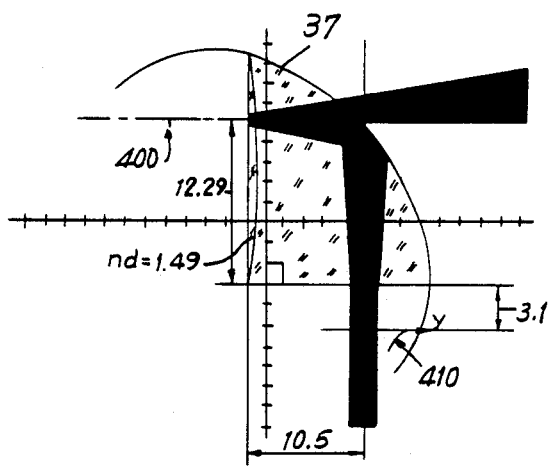
FIG. 25 is a diagramatic illustration of a light ray trace for an oval mirror.

Reference is next made to FIG. 25 wherein an optical fiber output light leveling system having an oval mirror is depicted. The system includes a cylindrical oval mirror 37 having a major diameter of 17 mm and a minor diameter of 12.02 mm, which is positioned at an angle of about 45°. It is essential to form the mirror from a material having high transmittance. It is also desirable to use a material which has a high refracting index. As only a small oval surface is required, it is possible to replace the oval surface with an arcuate surface or with a surface defined by a circle having a radius of 24 mm.

Optical fibers 3 are located at a position inwardly of focal point 400 of oval mirror 37 so that the mirror's magnification may be utilized for the positioning of the shutters. Oval mirror 37 may be formed from, for example, an acrylic, styrene, polyester or a polycarbonate resin. If the size of the mirror is reduced, the leakage of light increases due to the total reflection condition. However, if a film of a metal of high reflectivity such as aluminum or silver, is formed on the reflecting surface of the mirror by, for example, plating, evaporation, or sputtering, leakage of light is prevented. As a result, the size of the mirror can be reduced without an undue increase in the amount of light leakage. The shutter is provided at position 410.

The shutter window (microshutter) may be formed as a liquid crystal, electrochromic, magnetopheretic or electrophoretic cell or panel. A liquid crystal microshutter array may include a liquid crystal panel which has a liquid crystal composition confined between a glass substrate with at least one common electrode and a glass substrate having a plurality of signal electrodes, and a pair of deflecting plates between which the panel is disposed. The liquid crystal composition may be obtained by adding an optically active substance to a nematic liquid crystal having a cross-frequency (fc) not higher than 100 kHz at an ambient temperature at which electric anisotrophy is zero. A signal having a frequency higher than fc (fh) and a signal having a frequency lower than fc (fl) are applied to the common and signal electrodes. As a result, the microshutter works reliably at a repeating frequency of about 500 Hz which is a frequency several tens of times higher than that at which any conventional TN (twisted nematic) liquid crystal device works. The liquid crystal microshutter can also be made by utilizing a smetic liquid crystal.

Reference is made to FIGS. 26A, 26B, and 26C wherein a ½ duty rate liquid crystal panel used as a microshutter array constructed in accordance with the invention is depicted. Liquid crystal panel 4 includes a glass substrate 42 formed with two common electordes 420, each having a plurality of shutter windows 41. Another glass substrate 43 defines a plurality of segment electrodes 430, each having two shutter windows 41. The segment electrodes 430 are spaced apart from one another by an appropriate distance so that they may provide an appropriate power of dissolution. The accuracy of this distance is critical to achieve an improved yield of etching during the production of the device. The spacing is also important for enlarging the surface area of the shutter and preventing its mutual interference in operation.

Reference is next made to FIG. 27 wherein a ¼ duty liquid crystal panel constructed in accordance with another embodiment of the invention is depicted. Each segment electrode 430 crosses four common electrodes 420 and has four shutter windows 41. Shutter windows 41 have a longitudinal spacing of about 150 μm between adjacent windows and require an array of optical fibers 3 having an output end which defines a light transmitting surface with a width of 600 microns.

A ⅓ duty liquid crystal display panel for a microshutter may also be constructed in accordance with the principles described above with reference to the shutter windows of FIGS. 26 and 27. Each segment electrode would cross three common electrodes and have three shutter windows.

Reference is next made to FIG. 28 wherein the output end of a fiber output light leveling system of optical fibers 3 constructed in accordance with the invention is depicted. Although an increase in the bore diameter of optical fibers brings about an increase in the amount of light transmitted through the fibers, the thickness is restricted by the limited focussing surface area of a halogen lamp. It is therefore suitable to utilize a single row of 400 plastic optical fibers having a diameter of 0.5 mm, by way of example. The light travelling from the fibers to a liquid crystal shutter can have great variations in intensity. The intensity of light entering the shutter can be equalized if a light guide 7 and a guide plate 70 are provided at the output end of optical fibers 3 to confine light by total reflection. Light guide 7 may be formed from a glass or transparent resin plate.

The lack of uniformity in the light intensity is due to the fact that the linear rays obtained by the conversion of the spotlight source are defined by a plurality of optical fibers having a circular cross-section. A focusing optical fiber lens array is required to have an opening angle within which it receives light from a plurality of optical fibers in the conversion system through a microshutter. The use of optical fibers with small cross-sectional diameters for the fiber optical converter system is preferred, but the small diameter optical fibers are difficult to handle and expensive.

An increase in the distance between the fiber optical converter system and the shutter window array may be useful. However, such an increase in distance also requires an increase in the thickness of the fiber optical converter system which results in the need for a larger spotlight source which increases the difficulty of focusing the light and also reduces the density of energy. If a light guide in the shape of a columnar body transmitting light is provided between the fiber optical converter system and the microshutter, an increase in the distance between the fiber optical converter system and the microshutter may be effected without requiring an increase in the thickness of the fiber optical converter system.

An increase in the width of the liquid crystal shutter window prevents the use of the self-focusing optical fiber lens array 5 described above since the density of energy forming the image lacks uniformity and is lower in density along the areas at the edges of the lens than on the optical axis thereof. Therefore, it is necessary to use a lens having a larger conjugate length so that the intensity of light is not greatly reduced along the edge of the lens. A band-pass filter 23 transmitting a large amount of energies is used instead of an interference filter in order to prevent a reduction in the intensity of transmitted light (FIGS. 12, 13).

The light signal generator constructed in accordance with the invention is about thirty percent smaller in size than a system which includes a linear light source, such as a straight fluorescent lamp and thereby contributes to the realization of a smaller printer engine and a small printing apparatus.

Reference is next made to FIGS. 29A-K wherein a variety of modifications in fiber output light leveling system for a shutter window formed from a liquid crystal panel 4 are depicted. A system including a light guide 7 is shown in FIG. 29A. The system having a tapered light guide 71 is shown in FIG. 29B. A system having an oval mirror 37 is shown in shown in FIG. 29C. A variety of systems, each having a light guide or guides and an oval mirror 37 are shown in FIGS. 29D-29K.

The combination shown in FIG. 29D includes a light guide 7 and an oval mirror 37 located between light guide 7 and liquid crystal panel 4. The combination depicted in 29E includes a tapered light guide 71 located between optical fibers 3 and an oval mirror 37. The combination depicted in 29F incorporates a light guide 7 located between an oval mirror 7 and liquid crystal panel 4. The combination depicted in FIG. 29G includes a tapered light guide 71 located between oval mirror 37 and liquid crystal panel 4.

The combination depicted in FIG. 29H includes a light guide 7 disposed between optical fibers 3 and oval mirror 37 and a second light guide 7 located between oval mirror 37 and liquid crystal panel 4. The combination depicted in 29A includes a tapered light guide 71 between optical fibers 3 and oval mirror 37 as well as a light guide 7 between oval mirror 37 and liquid crystal panel 4. The combination depicted in FIG. 29J includes a light guide 7 between optical fibers 3 and oval mirror 37 and a tapered light guide 71 between oval mirror 37 and liquid crystal panel 4. The combination depicted in FIG. 29K includes a tapered light guide 71 between optical fibers 3 and oval mirror 37 and a second tapered light guide 71 between oval mirror 37 and liquid crystal panel 4. It is usually sufficient to employ a single light guide 7 (or tapered guide 71) as depicted in FIGS. 29D, 29E, 29F, or 29G.

Due to the spectral characteristics of an aperture type fluorescent lamp shown, by way of example, in FIG. 30, the fluorscent lamp has no appreciable effect on the chromatic aberration of a self-focusing lens array optical fiber. However, it is not possible to use an incandescent lamp having spectral characteristics which are shown by way of example in FIG. 31 unless the light is filtered to produce monochromatic light. If a filter having too small a half-value width is used, however, reduction in the amount of light energy disables high resolution and fast printing. It is, therefore, necessary to use a monochromatic filter having an optimum half-value width.

FIG. 32 is a graph showing by way of example the chromatic aberration of a self-focusing optical fiber lens array. The graph shows the relationship between the MTF characteristic of the best focus surface at 550 nm and the wavelength. FIG. 33 is graph showing the spectral sensitivity of a photo-sensitive body by way of example.

The MTF, which depends on the characteristics of the monochromatic filter to be used, can be calculated in accordance with the following formula by utilizing the MTF characteristic $M(\lambda)$ which depends on the spectral characteristics of the self-focusing optical fiber lens array, the spectral characteristic $R(\lambda)$ of the light source, the spectral characteristic $F(\lambda)$ of the filter and the spectral characteristic $S(\lambda)$ of the photo-sensitive drum. The MTF value thus obtained makes it possible to determine the half-value width of the filter.

Figure 34:
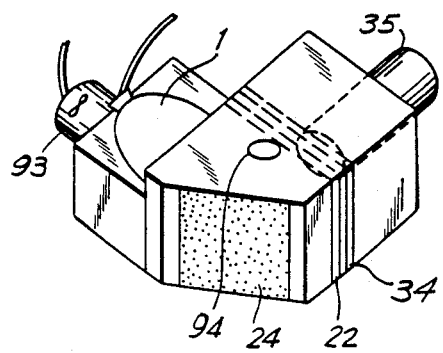
FIG. 34 is a perspective view of a lamp house for use with the light generating system.
Figure 35:
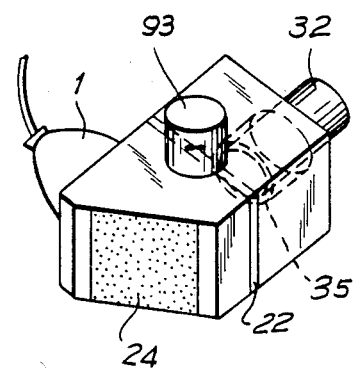
FIG. 35 is a perspective view of another lamp house for use with the light generating system.

Reference is next made to FIGS. 34 and 35 wherein lamp houses constructed in accordance with the invention are depicted. Lamp houses are used to provide insulation of heat between spotlight source 1 and integrating cylinder 35. A lamp house is not always required, particularly if spotlight source 1, such as a halogen lamp has a wattage of 40–80 watts, or preferably 50–70 watts. A lamp house is required if the lamp is lit at 100 watts (or at least 90 watts). The lamp house of FIG. 34 has an infrared infrared cutting filter 22 and a plano-concave lens 34 disposed between spotlight source 1 and integrating cylinder 35. In addition, a light diffusing plate 33 is located between source and integrating cylinder 35. A cooling fan 93 is provided proximate to source 1. It is also useful to provide an opening or a window 94 in the lamp house to allow the release of heat. A mirror 24 has a reflecting surface formed by the evaporation of aluminum. FIG. 35 shows a lamp house wherein the cooling fan 93 is located on top of the lamp house. Various other means are used to avoid heat related problems including the use of an open structure consisting only of portions required for supporting the lamp, cylinder, mirror, etc., and other components.

Figure 36:
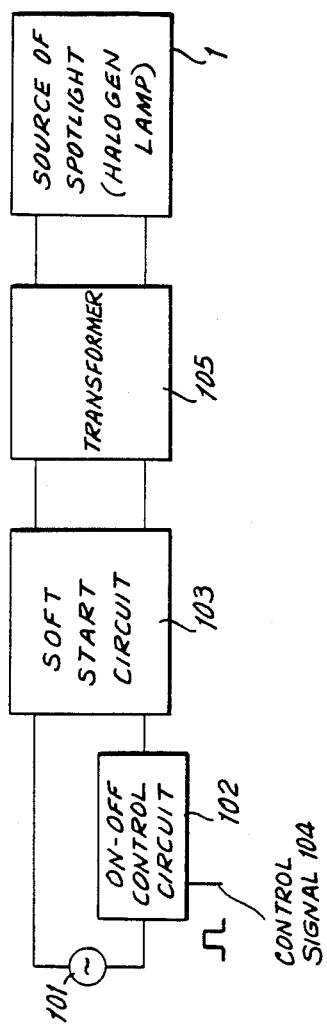
FIG. 36 is a block circuit diagram of a constant intensity light source device for driving a spotlight source constructed in accordance with the invention.

Reference is next made to FIG. 36 wherein a constant intensity light source system constructed in accordance with the invention is depicted. The light source system includes a circuit 102 for ON/OFF control of an input 101, a soft-start circuit 103 and a transformer 105 for driving the spotlight source (halogen lamp) 1 with an alternating current. ON/OFF control circuit 102 is controlled by an ON/OFF control signal 104 from an external source.

Figure 37:
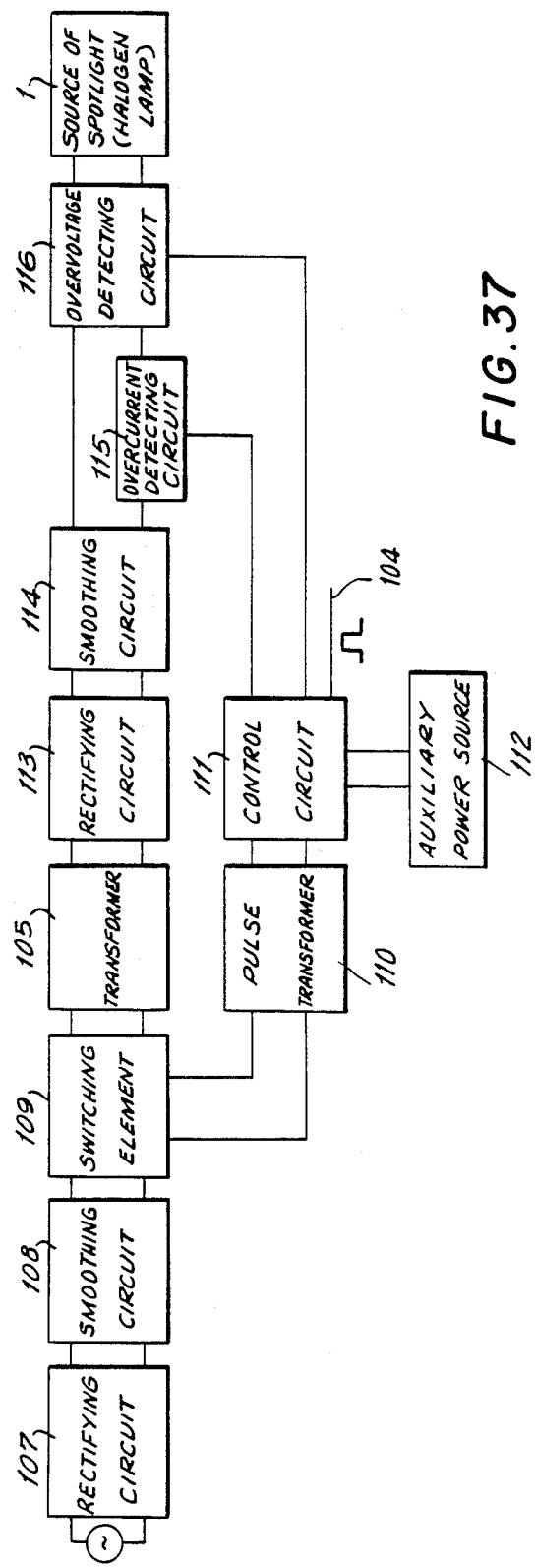
FIG. 37 is a block circuit diagram of a constant intensity light source device for driving a spotlight source constructed in accordance with another embodiment of the invention.

Reference is next made to FIG. 37 wherein a constant intensity light source system constructed in accordance with another embodiment of the invention is depicted.

The system of FIG. 37 is basically a DC drive system. The system includes an input 101, a rectifying circuit 107, a smoothing circuit 108, a switching element 109, a transformer 105, a rectifying circuit 113, a smoothing circuit 114, an over-current detecting circuit 115, an over-voltage detecting circuit 116, a pulse transformer 110, a control circuit 111, an auxiliary power source 112 and the spotlight source 1 (halogen lamp). Rectifying circuit 107, smoothing circuit 108, transformer 105, rectifying circuit 113 and ON/OFF control circuit 114 are four terminal elements with two input terminals and two output terminals, while switching element 109 is a six terminal device with two input terminals, two output terminals and two control terminals. The two input terminals of recifying circuit 117 are coupled across input 101. The output terminals of rectifying circuit 107 are coupled to the input terminal of smoothing circuit 108. Likewise, switching element 109, transformer 105, rectifying circuit 113 and smoothing circuit 114 are coupled with the input terminals of one device coupled to the output terminals of the preceding device. Over-current detecting circuit 115 is coupled between one output terminal of smoothing circuit 114 and one input terminal of over-voltage detecting circuit 116, the other input teriminal of over-voltage detecting circuit 116 being coupled to the other output terminal of smoothing circuit 114. The spotlight source 1 is coupled across over-voltage detecting circuit 116. Control circuit 111 receives inputs from over-current detecting circuit 115, over-voltage detecting circuit 116, an ON/OFF control signal 104 and auxiliary power source 112. The output of control circuit 111 is coupled to pulse transformer 110 which is connected to the control terminals of switching element 109 for the control thereof. The constant intensity light source system of FIG. 37 is a small and relatively lightweight system.

Figure 38:
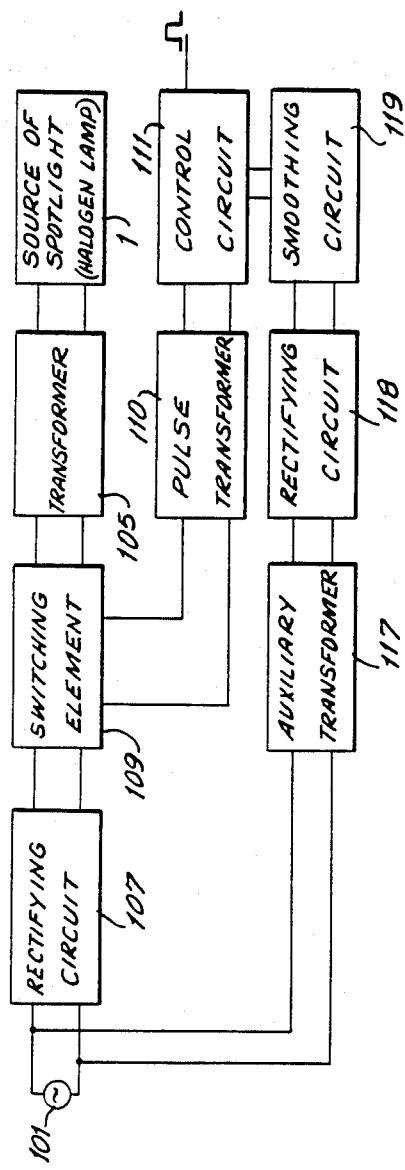
FIG. 38 is a block circuit diagram of a constant intensity light source device for driving a spotlight source constructed in accordance with a further embodiment of the invention.

Reference is next made to FIG. 38 wherein a constant intensity light source system constructed in accordance with another embodiment of the invention is depicted. A full-wave rectified voltage of 100 volts is applied to the primary side of a power source and switched at a high frequency of 30–50 kHz, by a forward or push-pull type, separately excited, converter to supply power to a halogen lamp on the secondary side which is thereby lit. An ON or OFF signal is supplied from an external source to turn on or off the lamp. The detection of fluctuations in input voltage over time is performed to permit automatic control of the width of the lamp driving pulse and maintain the light emitted by the lamp at a constant intensity.

Spotlight source 1 is a 12 Volt, 100 watt halogen lamp connected in series to the secondary side of the power source. An input 101 is full-wave rectified by a rectifying circuit 107. A pulse signal of about 30 kHz is transmitted from a control circuit 111 to a pulse transformer 110 for isolation and voltage-current conversion. The pulse signal is then transmitted to a power transistor or light switching element 109 by which the full-wave rectified voltage is switched at a high speed. The voltage is then transmitted to a transformer 105 to supply a constant amount of power always having an equal effective value to halogen lamp 1.

Where a forward type converter is used, a 100 μF or like electrolytic capacitor is often used, like a smoothing capacitor, after rectifying circuit 107, to absorb the reset energy generated in resetting the magnetic flux of transformer 105. If such a capacitor is used, a considerably ripple-free wave is applied to switching element 109 instead of the full-wave rectified voltage. While control circuit 111 is operated by auxiliary power supply from an auxiliary transformer 117, rectifying circuit 118 and a smoothing circuit 119, auxiliary transformer 117, rectifying circuit 118, and smoothing circuit 119 are not required if the auxiliary power is supplied from an external source as described above. Control circuit 111 controls the width of the pulse signal transmitted to the switching element and controls the intensity of light from the halogen lamp and the ON/OFF control thereof in accordance with the light intensity setting and ON/OFF signal 104.

Figure 40:
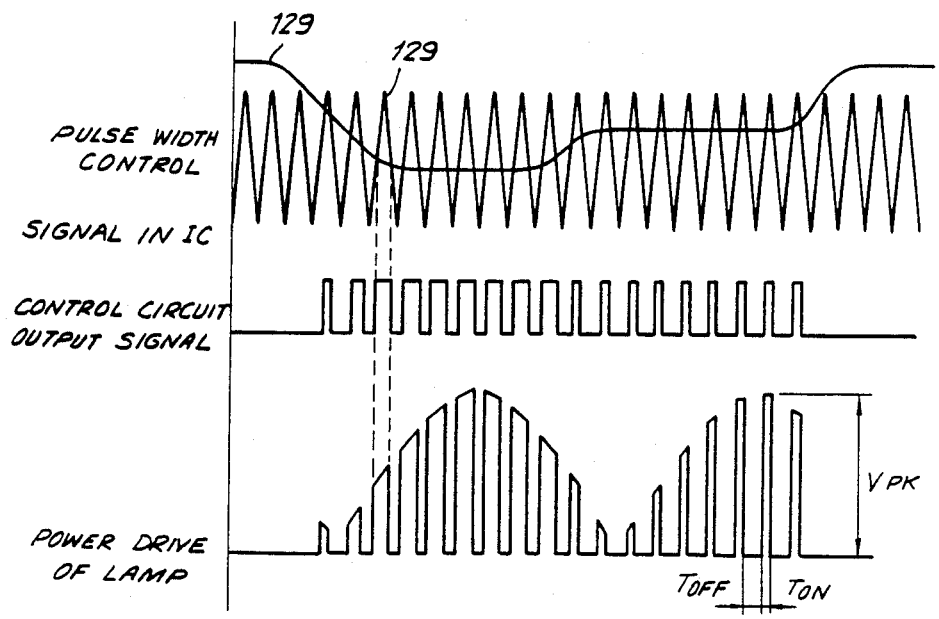
FIG. 40 is a graphical diagram showing the wave forms of a power source constructed in accordance with the invention.

The manner in which constant power is supplied to the halogen lamp is described with reference to FIG. 40 which shows the wave form of the drive voltage required for lighting the halogen lamp at an effective power P. AC power equal to a voltage $V_P$ is supplied to input 101. The following relationships exist:

$$D = T_{ON}/(T_{ON} + T_{OFF}) \quad (1)$$

$$V_{PK} = \sqrt{2} \cdot V_S/D \quad (2)$$

$$I_{PK} = (\sqrt{2} \cdot P)/(V_S \cdot D) \quad (3)$$

Where, D stands for the duty, $V_{PK}$ stands for the peak drive voltage, $I_{PK}$ stands for the peak current and $V_S$ stands for the DC voltage applied to light the halogen lamp at power P. The lamp is driven at a high frequency so that the DC power supplied to light the lamp and the effective power are equal to each other. If the voltage $V_P$ of input 102 fluctuates with time, however, the power P supplied to the lamp fluctuates with the square thereof and the intensity of light varies greatly. When $V_P$ has a fluctuation range of ±10% the variation in intensity of light has a range of about ±30%. Constant light intensity can be achieved if the duty D of the wave form of the lamp drive voltage is adjusted based on the $V_P$ fluctuation to assure that constant power P is supplied to the lamp. If the average drive voltage in FIG. 40 is expressed as $V_{av}$ and the resistance of the lamp prior to lighting is $R_z$, the drive power is expressed by the following formulas:

$$V_{av} = V_S/D \quad (4)$$

$$P = (V_{av}^2 \cdot D^2)/R_z \quad (5)$$

If the voltage $V_P$ of input 101 fluctuates by X% $V_{av}$ also shows a fluctuation of X%. If the pulse width D is altered by α% to supply constant power P to the lamp, $$P = [(1+X)V_{av}]^2 \cdot [(1+\alpha)D]^2/R_z \quad (6)$$

Because both equations (5) and (6) must be equal as the power P is constant, the following relationship between α and X exists:

$$\alpha = [1/(1+X)] - 1 \quad (7)$$

Equation (7) insures that the supply of power to the lamp is constant.

The winding ratio and capacity of main transformer 105 in FIG. 38 can also be calculated as an effective value. The following relationship exists $$n_s/n_p = V_s/V_p \quad (8)$$

Where $V_p$ stands for the effective value of voltage applied to the primary side of the main transformer, $V_s$ stands for the effective value of voltage applied to the secondary side, $n_p$ stands for the number of turns on the primary side and $n_S$ stands for the number of turns on the secondary side. The core material of the transformer may be selected so as to provide a capacity which is 1.1–1.2 times higher than the rated power of the halogen lamp. It is, for example, possible to use a core of ferrite $H_7C$ having a size of EI40.

Figure 39:
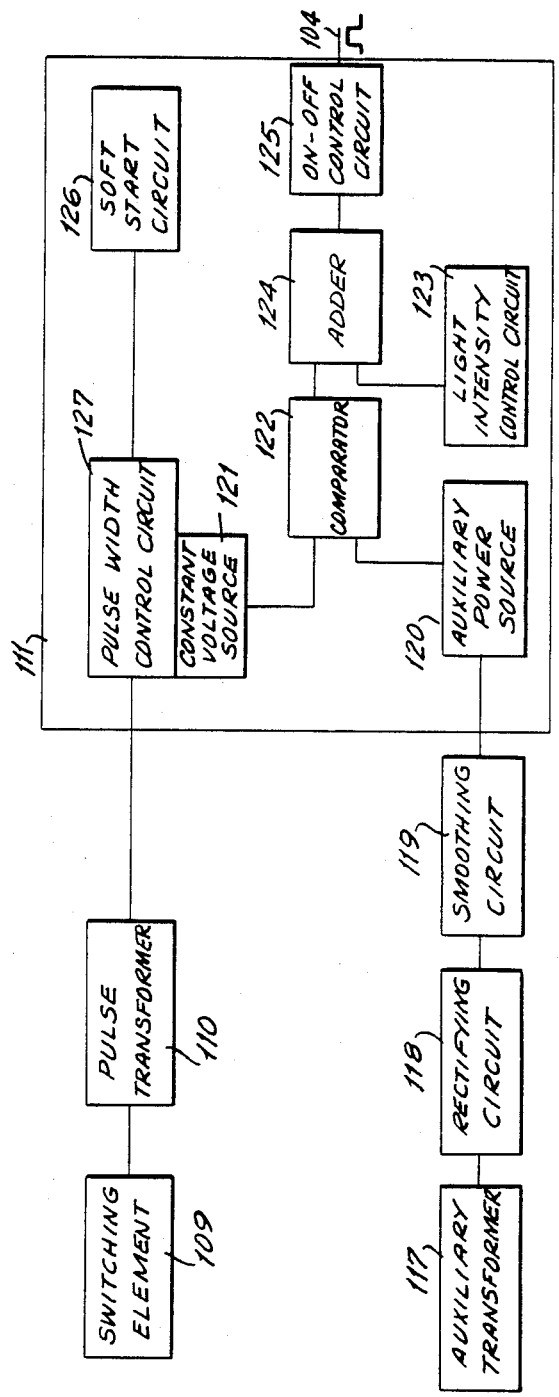
FIG. 39 is a block circuit diagram of a constant intensity light source device constructed in accordance with another embodiment of the invention.

Reference is next made to FIG. 39 wherein a control circuit 111 constructed in accordance with the invention is depicted. Control circuit 111 includes a pulse width control circuit 127 which can be formed from a commercially available IC for switching regulator control. Pulse width control circuit 127 generates a pulse wave having a width defined by the overlapping portions of a triangular or sawtoothed wave 128 in FIG. 40 and a set voltage 129 to drive switching element 109. As a result, the control described above for the constant power drive of the halogen lamp can be carried out at set voltage 129. As fluctuations in the voltage at input 101 are proportional to the fluctuation voltage at auxiliary power source 120, it is possible to use a comparator 122 to determine the voltage difference between auxiliary power source 120 and a constant voltage source 121, which may be a Zener diode. The fluctuation at voltage input 101 can also be detected by taking a portion of the lamp driving power, smoothing and comparing this voltage with the voltage at constant voltage source 121. If an auxiliary power supply is available from an external source, a reduction in cost can be achieved by omitting auxiliary transformer 117, rectifying circuit 118 and smoothing circuit 119. Comparator 122 has an amplification factor which enables a change in output voltage in accordance with the relationship of equation (7).

The voltage set by a light intensity control circuit 123 is added to the output voltage of comparator 122 by an adder 124 to yield a control voltage signal which is required for driving the halogen lamp with constant power. An ON/OFF control circuit 125 is controlled by an ON/OFF control signal 104 from an external source so that control circuit 125 transmits the signal from adder 124 when control signal 104 is in the ON position. On the other hand, when signal 104 is in the OFF position control circuit 125 generates a high voltage signal which does not overlap wave 128 in FIG. 40. A soft start circuit 126 protects the lamp and the switching element against damage in the event that the ON/OFF control of circuit 125 causes a sudden change in the control voltage signal resulting in the application of a large amount of power to the halogen lamp when the halogen lamp is in a cold state where the filaments have extremely low values of resistance and dangerously large currents would flow.

A light shielding device may be used to improve the print cycle time or reduce the electrical burden on the light source. A light shielding device constructed in accordance with an embodiment of the invention is shown by way of example in FIGS. 41A, 41B. The light shielding device is a mechanical shutter provided in the optical writing section of a liquid crystal printer to prevent light leakage from occurring during the liquid crystal refreshing cycle and, thereby eliminating the need to turn the light source ON and OFF.

Reference is made to FIG. 41A wherein a rotary solenoid 213, a rotary shaft 214 and a shutter 215 are provided in an optical system extending from a liquid crystal panel 4 to a self-focussing optical fiber lens array 5. Halogen lamp 1, not shown in FIG. 41A, generates light from the bottom of FIG. 41A. Halogen lamp 1 is a 12 Volt, 100 Watt halogen lamp. FIG. 41B is a side elevational view of the apparatus of FIG. 41A. Solenoid 213 is a bi-stable solenoid having a 90° rotating angle. Alternatively, it is possible to use a mono-stable solenoid with a rotating angle of 90° if a spring is provided between shaft 214 or shutter 215 and body 92 to urge shutter 215 back into its open position. As best seen in FIG. 41B, shaft 214 supports solenoid 213 on one side of body 92 and shutter 215 on the other side of body 92. The rotation of solenoid 213 causes shutter 215 to rotate through a 90° angle from the position shown by the broken line in FIG. 41A to the position shown as a solid line which the prevents the transmission of light to liquid crystal panel 4.

Figure 42:
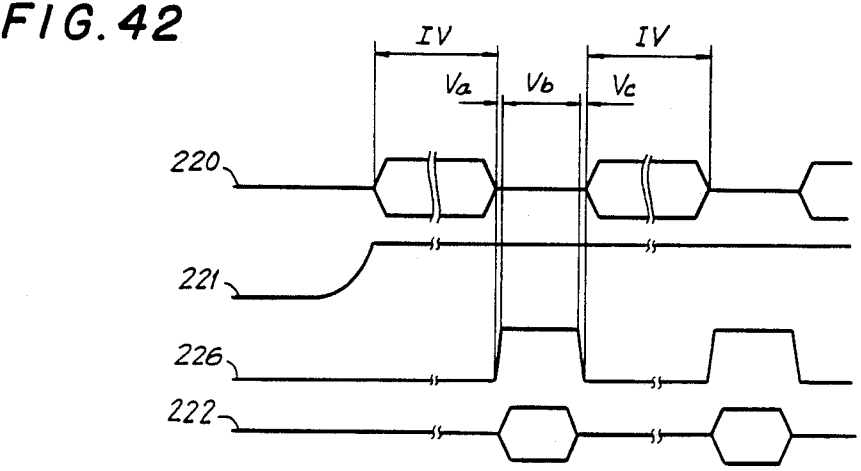
FIG. 42 is a timing diagram of various signals in the light intercepting device of FIG. 41.

Reference is made to FIG. 42 wherein a timing diagram showing the operation of the shutter mechanism of FIGS. 41A, 41B is depicted. The optical writing operation of liquid crystal panel 4 is shown at 220, the ON/OFF control of light source 1 is shown at 221, the refreshing operation for a liquid crystal is shown at 222 and the closing of shutter 215 is shown at 226. After about eight seconds of writing, indicated as IV, solenoid 213 rotates shutter 215 to shut off the transmission of light to lens array 5. The shutting operation requires a period $V_a$ of about 0.1 seconds. Then, the liquid crystal refreshing is performed for a period $V_b$ for about 0.8 seconds, while light source 1 remains lit. Shutter 215 is then opened during a time period $V_c$ of about 0.1 seconds. Then, another cycle IV during which writing is allowed begins. As a result, the apparatus allows for continuous printing operation by refreshing the liquid crystal within about one second while the light source is kept lit. This apparatus increases the continuous printing cycle by about 10% and prolongs by about 15% the life of the light source lamp as compared with conventional apparatus.

Figure 43:
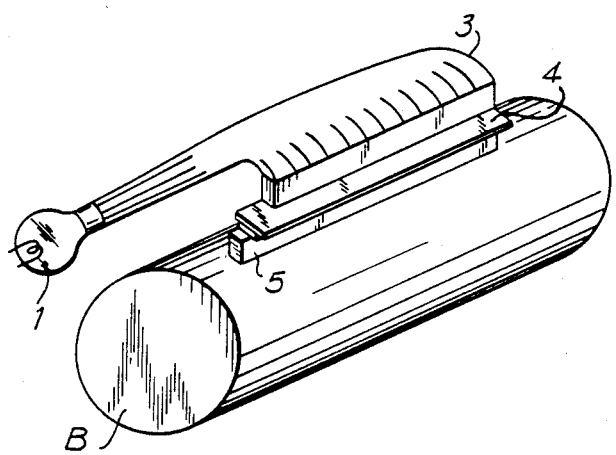
FIG. 43 is a perspective view of a printing apparatus constructed in accordance with another embodiment of the invention.

The optical focussing system may be located on one side of photosensitive drum B as shown, by way of example, in FIG. 43.

Figure 44:
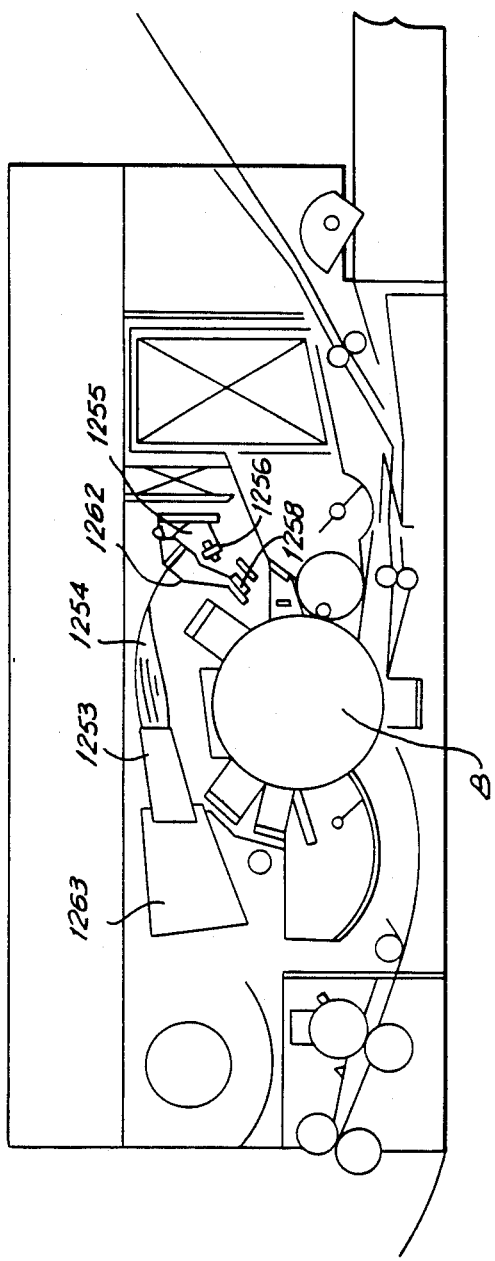
FIG. 44 is a side elevational view of a printer constructed in accordance with another embodiment of the invention.

Reference is next made to FIG. 44 wherein a printer mounted in a housing with an engine is depicted. The power source is a 12 V, 100 W small and engine source. It is a power control type 30 kHz high frequency power source with a light intensity ripple less than or equal to 1%. The light source is a 12 V, 100 W halogen lamp. A dichroic oval mirror 1250 is defined by a multiplicity of small flat surfaces to transmit light having a wavelength having at least 700 nm and to reduce the variation in light intensity due to filament image formation. That is, the light emanating from the light source originates with the filaments and the spotlight source is in actuality a filament shaped source. A plane mirror 1259 is provided to deflect the light flux from the lamp 90° prior to transmission to a heat proof lens 1252 to provide a higher degree of flexibility in the layout of the light source device within the printer device. Lens 1252 is formed from heat absorbing glass capable of cutting out light having a wavelength greater than 700 nm. Lens 1252 has an infrared reflecting film for cutting off the infrared radiation from the lamp and the infrared light reflected by the dichroic mirror on the input surface plane. The output end of lens 1252 is slightly concave to adapt the distribution of light from the lamp to the opening angle of optical fibers 1254. Lens 1252 forms a diffusing surface similar to the surface of ground glass to enable an improved diffusion of light.

Figure 47:
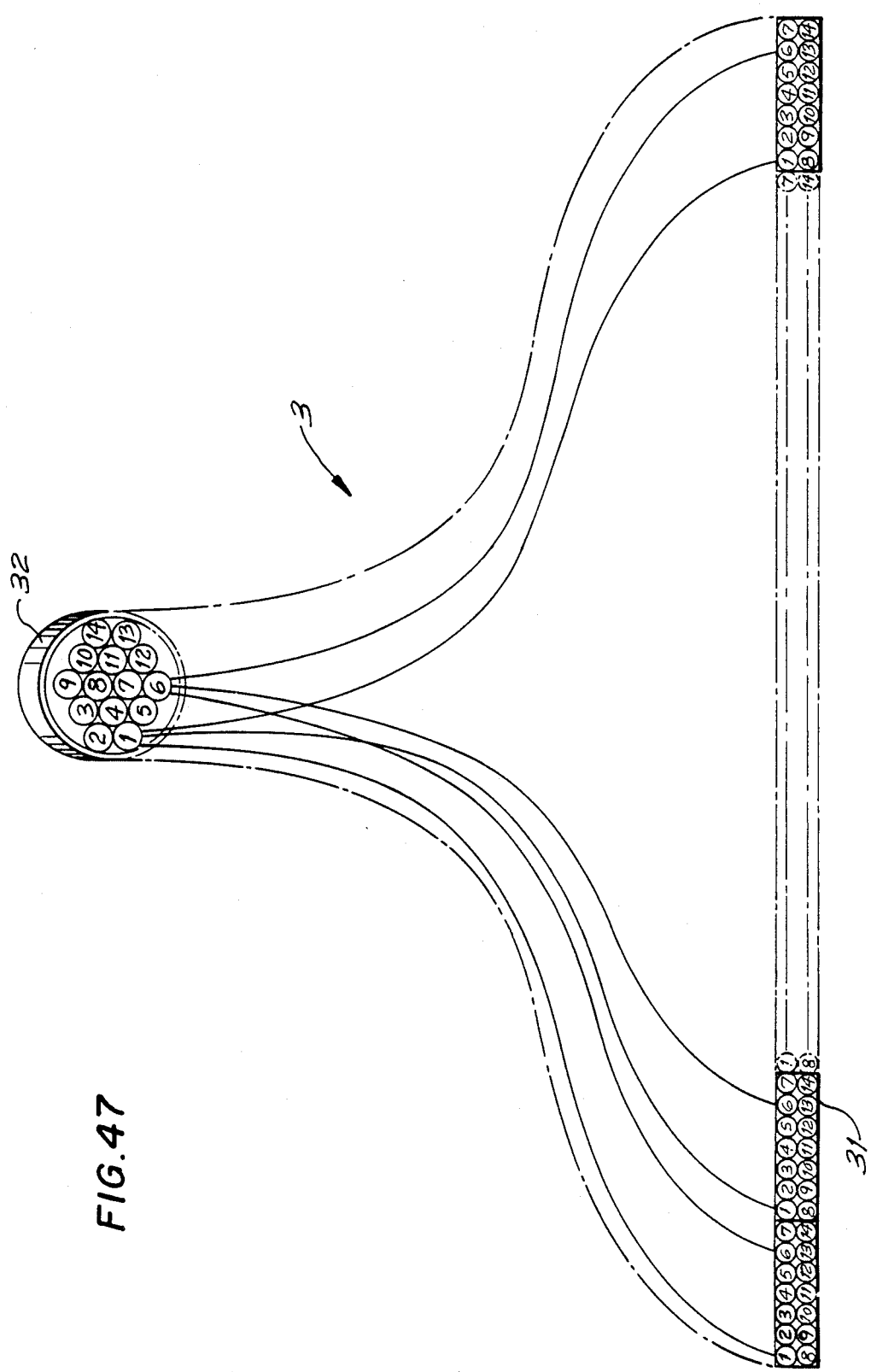
FIG. 47 is a schematic view of the arrangement of optical fibers in an optical fiber array.

An aluminum cylinder having an inner surface defining a mirror is used to reduce the non-uniformity in light intensity on the diffusing surface and achieve uniform radiation of light to the fiber bundle. The input end of fiber bundle 1254 is spaced apart from the diffusing surface. Fiber bundle 1254 is composed of about 600 plastic optical fibers each having a diameter of 0.75 mm. The bundle has a circular input end and a planar output end having a width of about 225 mm and is composed of two rows of fibers. The fiber bundle is branched at a planar output end into about forty groups each of which has fourteen fibers composed of two rows of seven fibers (FIG. 47). The fibers, picked up systematically from respective groups are gathered into fourteen bunches of fibers in order to reduce non-uniformity of light intensity. Each group has one fiber from each bunch.

An oval mirror 1255 is provided to deflect the output of the fiber bundle to enable the installation of the light signal generator within the limited space available in the printer mechanism. A plurality of fibers transmit light to each shutter so that the variation in intensity of light from shutter to shutter is reduced. The use of fourteen fibers to transmit light to each shutter is effective in reducing variation in brigthness intensity between shutters and thereby producing a clear image.

Figure 45:
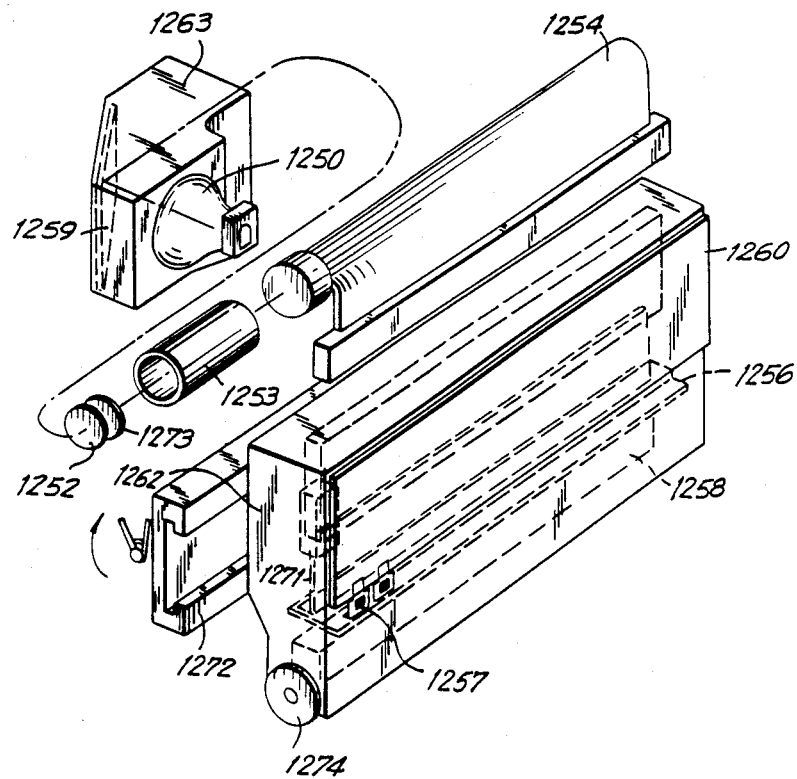
FIG. 45 is an enlarged, partially expanded perspective view of a printing apparatus constructed in accordance with another embodiment of the invention.

The liquid crystal shutter is a $\frac{1}{3}$ duty panel construction and has an aperture size of 150 $\mu m^2$ and a printing density of 240 dots per inch. The wiring for driving a data electrode is located on only one side of a glass substrate and connected to a flexible polyimide substrate carrying a driving IC 1257 (as can be seen in FIG. 45). The polyimide substrate is also connected to a substrate carrying a power source and a bus band. The light passing through the microshutter is collected by self-focussing optical fiber lens array 1258 having a conjugate length of 48 mm and an equivalent F value of 2.8 to form dot images of photo-sensitive drum B.

The printer constructed in accordance with this embodiment of the invention supplies 20 ergs/cm$^2$ of light energy at a printing speed of 5 cm/sec. As a result, there is no need for a special photo-sensitive drum highly sensitive to the particular wavelength of light used, as opposed to laser or LED printers. The printer constructed in accordance with this invention has a focal depth of ±1 mm and is, therefore, easy to assemble, mount in a printer engine and maintain.

Reference is next made to FIG. 45 wherein another embodiment of the invention wherein an integral mounting of a light signal generator and a printer engine is depicted. The system includes a light source and a first optical leveling system of the type described above. It also includes a band pass filter 1273 having a transmission center wavelength of 550 nm and a half-value width of 100 nm. A bundle of optical fibers is bent at right angles to create a compact construction apparatus. The bundle is composed of 226 plastic fibers having a diameter of 1 mm and fitted in a guide groove on a unit housing. A second optical leveling system includes an acrylic tapered light guide 1271 having an input end thickness of 0.7 mm, a taper angle of 2°, a length of 20 mm and an effective width of 226 mm. Acrylic tapered light guide 1271 is secured in the unit housing and has an optical axis coinciding with that of fiber bundle 1254.

A liquid crystal panel 1256 is a ⅓ duty panel which has a microshutter spacing of about 250 microns. A liquid crystal driver 1257 is bonded to liquid crystal panel 1256 by use of an adhesive with conductivity and anisotropicity. A bus substrate 1260, which is connected to the liquid crystal driver, is secured on the unit housing and connected by a connector to an external source of power and a control circuit. A self-focusing optical fiber lens array 1258 has a conjugate length of 20 mm, an effective length of 226 mm and a brightness of $F_1$. Self-focusing optical fiber lens array 1258 is fitted in unit housing 1262.

The light signal generator constructed in accordance with this embodiment of the invention can print with a high resolution if it is installed in a printer engine with a positional accuracy of 0.3 mm. This accuracy of installation is, however, not always easy to obtain, and a pair of guide rollers 1274 are, therefore, provided at both ends of unit housing 1262 for adjustment of the focal point.

Guide rollers 1274 are screwed to housing 1262 after the positional accuracy has been adjusted. Then, they are fitted in a guide rail 1272 provided in the printing engine. When the unit has been adjusted and set in position, a locking mechanism is released to cause a spring to urge the guide rollers into contact with the photosensitive drum. The reverse procedure is used to remove the unit from the printing engine. The locking mechanism is set to move guide rollers 1274 away from the drum and enable the removal of the light signal generator.

Unit housing 1262 has a maximum amplitude of vibration of 100 microns when the drum is rotating. The vibration of the lamp shortens its useful life. Therefore, the lamp is secured to the housing and a clearance is provided in the area in which the first optical leveling system is fitted. The flexibility of the fiber bundle is also useful in reducing such vibration.

The printer constructed in accordance with the invention aids in the construction of a small engine for the printer. The light signal generator is easy to maintain since the unit housing is installed through one side of the engine as is the case with other electron photographic apparatus. The lamp is also easy to change, the use of a visible-region band-pass filter for the light source system enables the complete interception of infrared light from the light source and protects the optical fibers from heat damage.

Reference is next made to FIGS. 46A, 46B, 46C and 46D wherein another embodiment of a printer constructed in accordance with the invention is depicted. The printer in essence includes a spotlight source with a focussing mirror, a device to remove infrared rays, a device to bend the optical path and a device to convert the spotlight source to linear light rays. The conversion device includes a plurality of step-index optical fibers which are bundled at one end in a cylindrical form, while the other ends of the fibers are disposed in a plane. The focussing mirror has a paraboloid of revolution defined by a multiplicity of very small flat surfaces. It is a dichroic mirror transmitting infrared rays. The spotlight source is a lamp positioned on the optical axis of the mirror, ahead of the focal point of its paraboloid of revolution. The beam emitted by the lamp has a waist which is less than about 70% of the diameter of the paraboloid of revolution. The light converting device has an input end located on the optical axis of the mirror and an output end from which light is selectively transmitted to a light-sensitive body, such as a drum.

Alternatively, it is possible to position the optical fibers substantially within the working distance of the lamp and dispose the dichroic mirror on the optical axis between the lamp and the optical fibers. It is also possible to position the optical fibers substantially within the working distance of the lamp and provide at least an infrared absorbing filter in front of the input end of the optical fibers.

A small extremely bright light source, such as a halogen lamp, provides a highly stable light source. The minimization of parts, including the device for converting the spotlight source to linear rays of light enables for a high efficiency and for small variations in intensity of light. In addition, a small light source facilitates the installation of the apparatus in a printing engine.

Reference is now made to FIG. 46A wherein the light source is a halogen lamp 12 with filaments 17 and a focusing mirror 11. The optical fiber system 20 has its input end 311 located at the working distance of the lamp (the distance between the output end of the lamp and the waist of the beam). An optical leveling system device is provided to reduce non-uniformity in the intensity of light leaving the output end 15 of optical fiber system 20 before it is transmitted to an optical switching element, such as a ferro-electric optical switching array or a liquid crystal shutter window array. The optical leveling system may also include an oval mirror or light guide plate formed from an acrylic resin. The light passing through the shutter forms an electro-static latent image on a photo-sensitive drum and is then developed and transfer printed.

It is desirable to use a cold light source which insures small variations in light intensity and a high level of intensity within the beam's waist. The focusing mirror is, therefore, a dichroic mirror having a paraboloid of revolution defined by a multiplicity of very small planes and having a cutoff wavelength of at least 700 nm, which is required to remove infrared rays. In addition, the lamp filaments are located on the optical axis in front of the focal point of the paraboloid and the beam has a waist diameter which is equal to about 70% of the diameter of the mirror. The waist is that portion of the beam of lamp 12 at which the beam has a smaller cross-section area than any other portion of the beam.

FIG. 46B is a graph showing the intensity of light and non-uniformity in intensity of light in the input end 14 of the fiber bundle when the spotlight source is moved along the optical axis of mirror 11. It also shows the relationship between the relative position of the source of the spotlight along the optical axis of mirror 11 and the ratio of the beam waist diameter to the diameter of mirror 11. The non-uniformity in intensity of light is closely correlated to the diameter ratio as is obvious from the graph. If the diameter ratio is less than about 70%, the non-uniformity of light intensity does not exceed about 20%. This non-uniformity does not present any printing problems when the light is transmitted to the light-sensitive body through the shutter windows. A diameter of less than about 70% also increases the average intensity of light. The abscissa of the graphs of FIG. 46B represents the distance of the spotlight source from mirror 11.

The variation in intensity of light was tested at the output end of the optical leveling system using the lamp described above and a spotlight source to linear light ray converting device including 300 plastic fibers having a diameter of 0.75 mm and a radiation width of 225 mm. A non-uniformity of intensity of less than 20% was found and presented no substantial printing problems.

Figure 46C:
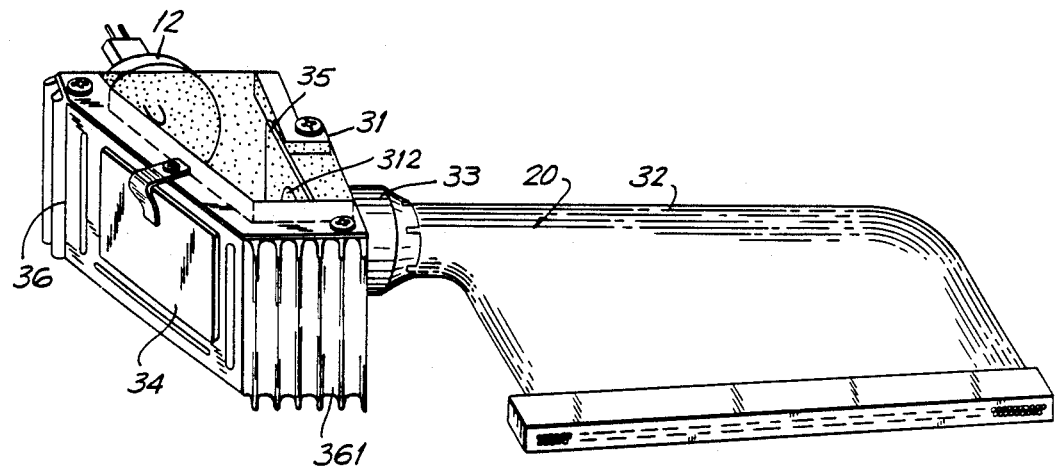
FIG. 46C is a perspective view of the light generating system of FIG. 46A.

The plastic fibers are, however, limited in heat resistance. This limitation restricts the power of the lamp which can be used and the amount of light which can be obtained. This in turn limits the speed of electron photographic processing and the sensitivity of the photo-sensitive drum. An increase in light output is, therefore, desired. FIG. 46C shows a high output light source system by way of example. It includes a diecast aluminum lamp housing 36. The optical housing defined between a lamp 12 and the input end 312 of a spotlight source to linear light ray converting device 20 is bent by a mirror 24 in order to reduce the space required for installation. The mirror is a dichroic mirror transmitting infrared rays. It has a cutoff wavelength of at least 750 nm to effectively cut off infrared rays from a 50 W halogen lamp.

Figure 46D:
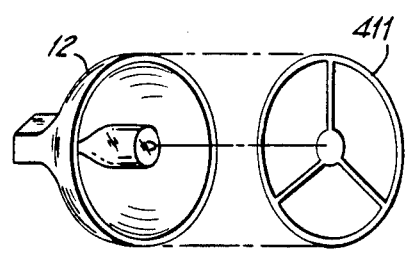
FIG. 46D is an exploded perspective view of a light source.

A light shielding plate 361, formed from a plate of metal, such as aluminum or iron, is effective to intercept the heat radiation from the lamp and prevent it from being transmitted to the converting device thereby preventing an undesirable rise in the optical fibers' temperature. FIG. 46D shows an equally effective central light shielding plate 411 made of a metal and disposed in front of the lamp. If a cooling device constructed of honeycomb aluminum construction is provided for the lamp housing it is possible to keep the optical fiber temperature at a level which does not exceed 20° C.

The light source system described above enables the liquid crystal printing apparatus constructed in accordance with this invention to achieve 10 erg/cm$^2$ at a printing speed of 5 cm per second. It is equally effective to use an aluminum image reflecting mirror instead of the dichroic mirror to remove infrared rays and dispose a heat absorbing filter in front of the input end of the converting device.

The diameter ratio of about 70% may be regarded as substantially equal to an area ratio of about 0.5. The latter definition is more appropriate since it covers a wider range of configurations including oval and square.

Although the converging mirror may be alternatively be a mirror having an oval surface, a mirror having a paraboloid of revolution is preferred, since it provides a greater allowance for assembling the lamp, reduces variations in light intensity and is suitable for mass production.

A latent image was formed on a photo-sensitive drum from the light signals generated by the light signal generator described above and printed by an electro-static photographic process. The printer was found to have a resolution power of 10 line/mm and be capable of printing at a top speed of 10 sheets per minute. The halogen lamp reaches its full ON level in about 0.4 seconds and has a high degree of stability. It shows an aging degree of only about 5% before its expected life expires. Therefore, it does not required a brightness control or other feedback system.

Accordingly, it is clear from the above description that the invention provides a light transmission system which is inexpensive, highly stable and substantially free from variation in light intensity thereby providing a printing apparatus with a high degree of resolution and a high printing speed.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A printing apparatus for use in a printer with a photo-sensitive drum comprising: spotlight means for generating a light providing essentially a point source; a focusing mirror optically coupled to the spotlight means for converting the point source of light into a beam; means for removing infrared rays from the light optically coupled to the spotlight means; means for bending the optical path of the beam of light including a reflecting mirror, optically coupled to the focusing mirror, the reflecting mirror for transmitting infrared rays in the beam of light to outside the apparatus; and means for converting the beam of light into a linear array of rays of light and further bending the optical path; whereby a light path is defined from the spotlight means to the means for converting the beam of light into a linear array of rays of light via the focusing mirror and the means for bending the optical path.

2. The printing apparatus of claim 1, wherein the reflecting mirror is a focusing dichroic mirror.

3. A printing apparatus, as claimed in claim 1, wherein the means for converting the beam of light into a linear array of rays of light includes at least one optical fiber the optical fiber being bent forming the optical path.

* * * * *